(12) United States Patent
Lalonde et al.

(10) Patent No.: US 9,501,642 B2
(45) Date of Patent: *Nov. 22, 2016

(54) RENDER ENGINE, AND METHOD OF USING THE SAME, TO VERIFY DATA FOR ACCESS AND/OR PUBLICATION VIA A COMPUTER SYSTEM

(71) Applicant: PayPal, Inc., San Jose, CA (US)

(72) Inventors: Chris Lalonde, Campbell, CA (US); Andrew Millard Brown, Mountain View, CA (US); Mathew Gene Henley, Campbell, CA (US); Quang D. Pham, San Jose, CA (US); Kevin Black, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/280,222

(22) Filed: May 16, 2014

(65) Prior Publication Data

US 2014/0250532 A1    Sep. 4, 2014

Related U.S. Application Data

(63) Continuation of application No. 13/735,633, filed on Jan. 7, 2013, now Pat. No. 8,732,826, which is a continuation of application No. 10/876,336, filed on Jun. 23, 2004, now Pat. No. 8,353,028.

(60) Provisional application No. 60/581,857, filed on Jun. 21, 2004.

(51) Int. Cl.
G06F 12/14    (2006.01)
G06F 21/56    (2013.01)

(Continued)

(52) U.S. Cl.
CPC .............. *G06F 21/56* (2013.01); *G06F 21/50* (2013.01); *G06F 21/51* (2013.01); *G06F 21/566* (2013.01);

(Continued)

(58) Field of Classification Search
CPC .............. H04L 63/1416; H04L 63/14; G06F 17/30876; G06F 21/56; G06F 221/2119; G06Q 30/0641
See application file for complete search history.

(56) References Cited

U.S. PATENT DOCUMENTS 6,088,803 A    7/2000    Tso et al.
6,272,641 B1   8/2001    Ji (Continued)

FOREIGN PATENT DOCUMENTS

DE    10126752 A1    12/2001
EP     1769359 B1     6/2012

(Continued)

OTHER PUBLICATIONS

The Architecture of Robust Publising Systems. Waldman et al. ACM( Nov. 2001).*

(Continued)

*Primary Examiner* — Venkat Perungavoor
(74) *Attorney, Agent, or Firm* — Maschoff Brennan

(57) ABSTRACT

A method and system to verify active content at a server system include receiving, at the server system a communication (e.g., an e-mail message or e-commerce listing) that includes active content that is to be made accessible via the server system. At the server system, the active content is rendered to generate rendered active content. The rendered active content presents a representation of information and processes to which an end user will be subject. At the server system, the rendered active content is verified as not being malicious.

20 Claims, 13 Drawing Sheets

(51) Int. Cl.
*H04L 29/06* (2006.01)
*G06F 21/50* (2013.01)
*G06F 21/51* (2013.01)
*G06F 21/60* (2013.01)
*G06Q 30/00* (2012.01)

(52) U.S. Cl.
CPC ........... *G06F 21/60* (2013.01); *H04L 63/1441* (2013.01); *G06F 2221/2115* (2013.01); *G06F 2221/2119* (2013.01); *G06F 2221/2151* (2013.01)

(56) References Cited

U.S. PATENT DOCUMENTS

| | | |
|---|---|---|
| 6,289,460 B1 | 9/2001 | Hajmiragha |
| 6,366,575 B1 | 4/2002 | Barkan |
| 6,487,664 B1 | 11/2002 | Kellum |
| 6,560,329 B1 | 5/2003 | Draginich et al. |
| 6,721,721 B1 | 4/2004 | Bates et al. |
| 6,785,732 B1 | 8/2004 | Bates et al. |
| 6,829,708 B1 | 12/2004 | Peinado et al. |
| 6,952,776 B1 | 10/2005 | Chess |
| 7,013,298 B1 | 3/2006 | De La Huerga |
| 7,080,407 B1 | 7/2006 | Zhao et al. |
| 7,096,215 B2 | 8/2006 | Bates et al. |
| 7,096,500 B2 | 8/2006 | Roberts et al. |
| 7,107,618 B1 | 9/2006 | Gordon et al. |
| 7,237,265 B2 | 6/2007 | Reshef et al. |
| 7,260,847 B2 | 8/2007 | Sobel et al. |
| 7,269,735 B2 | 9/2007 | Raley et al. |
| 7,328,454 B2 | 2/2008 | Strickland et al. |
| 7,418,731 B2 | 8/2008 | Touboul |
| 7,526,810 B2 | 4/2009 | Lalonde et al. |
| 7,971,245 B2 | 6/2011 | Lalonde et al. |
| 8,032,938 B2 | 10/2011 | Lalonde et al. |
| 8,353,028 B2 | 1/2013 | Lalonde et al. |
| 8,732,826 B2 | 5/2014 | Lalonde et al. |
| 2002/0013910 A1 | 1/2002 | Edery et al. |
| 2002/0174341 A1 | 11/2002 | Logue et al. |
| 2003/0018779 A1 | 1/2003 | Hughes et al. |
| 2003/0023708 A1 | 1/2003 | Jung |
| 2003/0074574 A1 | 4/2003 | Hursey et al. |
| 2003/0097591 A1 | 5/2003 | Pham et al. |
| 2003/0120952 A1 | 6/2003 | Tarbotton et al. |
| 2003/0144904 A1 | 7/2003 | Beckman et al. |
| 2003/0212913 A1 | 11/2003 | Vella et al. |
| 2003/0226033 A1 | 12/2003 | Zinda et al. |
| 2004/0078569 A1 | 4/2004 | Hotti |
| 2004/0078580 A1 | 4/2004 | Hsu et al. |
| 2004/0088570 A1 | 5/2004 | Roberts et al. |
| 2004/0148281 A1 | 7/2004 | Bates et al. |
| 2004/0260676 A1 | 12/2004 | Douglis et al. |
| 2004/0268145 A1 | 12/2004 | Watkins et al. |
| 2005/0005107 A1 | 1/2005 | Touboul |
| 2005/0005160 A1 | 1/2005 | Bates et al. |
| 2005/0021994 A1 | 1/2005 | Barton et al. |
| 2005/0283833 A1 | 12/2005 | Lalonde et al. |
| 2005/0283835 A1 | 12/2005 | Lalonde et al. |
| 2005/0283836 A1 | 12/2005 | Lalonde et al. |
| 2009/0187990 A1 | 7/2009 | Lalonde et al. |
| 2013/0125236 A1 | 5/2013 | Lalonde et al. |

FOREIGN PATENT DOCUMENTS

| | | |
|---|---|---|
| GB | 2368163 | 4/2002 |
| WO | WO-0178312 A1 | 10/2001 |
| WO | WO-02099689 A1 | 12/2002 |
| WO | WO-2006009961 A2 | 1/2006 |
| WO | WO-2006009961 A3 | 1/2006 |

OTHER PUBLICATIONS

A Web Developer's Guide to Cross-Site Scripting. SANS(2003).*
Globule: A Platform for Self-Replicating Web Documents. LNCS(2001).*
"U.S. Appl. No. 10/875,443, Advisory Action mailed Jun. 27, 2007", 3 pgs.
"U.S. Appl. No. 10/875,443, Advisory Action mailed Jul. 14, 2006", 3 pgs.
"U.S. Appl. No. 10/875,443, Appeal Brief filed Sep. 10, 2007", 32 pgs.
"U.S. Appl. No. 10/875,443, Final Office Action mailed Apr. 6, 2007", 9 pgs.
"U.S. Appl. No. 10/875,443, Final Office Action mailed Apr. 24, 2006", 11 pgs.
"U.S. Appl. No. 10/875,443, Final Office Action mailed Jul. 2, 2008", 15 pgs.
"U.S. Appl. No. 10/875,443, Non Final Office Action mailed Oct. 18, 2005", 6 pgs.
"U.S. Appl. No. 10/875,443, Non Final Office Action mailed Oct. 18, 2006", 7 pgs.
"U.S. Appl. No. 10/875,443, Non-Final Office Action mailed Dec. 6, 2007", 13 pgs.
"U.S. Appl. No. 10/875,443, Notice of Allowance mailed Dec. 19, 2008", 8 pgs.
"U.S. Appl. No. 10/875,443, Preliminary Amendment mailed Aug. 5, 2005", 3 pgs.
"U.S. Appl. No. 10/875,443, Response filed Jan. 18, 2007 to Non Final Office Action mailed Oct. 18, 2006", 13 pgs.
"U.S. Appl. No. 10/875,443, Response filed Feb. 7, 2006 to Non Final Office Action mailed Oct. 18, 2005", 16 pgs.
"U.S. Appl. No. 10/875,443, Response filed Apr. 7, 2008 to Non-Final Office Action mailed Dec. 6, 2007", 15 pgs.
"U.S. Appl. No. 10/875,443, Response filed Jun. 6, 2007 to Final Office Action mailed Apr. 6, 2007", 25 pgs.
"U.S. Appl. No. 10/875,443, Response filed Jun. 26, 2006 to Final Office Action mailed Apr. 24, 2006", 18 pgs.
"U.S. Appl. No. 10/875,443, Response filed Oct. 2, 2008 to Final Office Action mailed Jul. 2, 2008", 15 pgs.
"U.S. Appl. No. 10/876,134, Examiner Interview Summary mailed Nov. 22, 2010", 2 pgs.
"U.S. Appl. No. 10/876,134, Final Office Action mailed Sep. 16, 2010", 9 pgs.
"U.S. Appl. No. 10/876,134, Final Office Action mailed Sep. 18, 2008", 8 pgs.
"U.S. Appl. No. 10/876,134, Non Final Office Action mailed Feb. 22, 2008", 9 pgs.
"U.S. Appl. No. 10/876,134, Non Final Office Action mailed Apr. 2, 2009", 7 pgs.
"U.S. Appl. No. 10/876,134, Non Final Office Action mailed Nov. 19, 2009", 8 pgs.
"U.S. Appl. No. 10/876,134, Non-Final Office Action mailed Jan. 30, 2008", 11 pgs.
"U.S. Appl. No. 10/876,134, Non-Final Office Action mailed May 4, 2010", 6 pgs.
"U.S. Appl. No. 10/876,134, Notice of Allowance mailed Feb. 16, 2011", 10 pgs.
"U.S. Appl. No. 10/876,134, Preliminary Amendment filed Aug. 5, 2005", 3 pgs.
"U.S. Appl. No. 10/876,134, Response filed Jan. 21, 2009 to Final Office Action mailed Sep. 18, 2008", 13 pgs.
"U.S. Appl. No. 10/876,134, Response filed Feb. 19, 2010 to Non Final Office Action mailed Nov. 19, 2009", 14 pgs.
"U.S. Appl. No. 10/876,134, Response filed May 22, 2008 to Non Final Office Action mailed Feb. 22, 2008", 12 pgs.
"U.S. Appl. No. 10/876,134, Response filed Jul. 17, 2009 to Non Final Office Action mailed Apr. 2, 2009", 14 pgs.
"U.S. Appl. No. 10/876,134, Response filed Aug. 4, 2010 to Non Final Office Action mailed May 4, 2010", 13 pgs.
"U.S. Appl. No. 10/876,134, Response filed Dec. 16, 2010 to Final Office Action mailed Sep. 16, 2010", 12 pgs.
"U.S. Appl. No. 10/876,336, Response filed Aug. 1, 2012 to Non Final Office Action mailed Apr. 5, 2012", 10 pgs.
"U.S. Appl. No. 10/876,336, Advisory Action mailed Dec. 1, 2010", 3 pgs.

(56) References Cited

OTHER PUBLICATIONS

"U.S. Appl. No. 10/876,336, Final Office Action mailed Mar. 4, 2010", 6 pgs.
"U.S. Appl. No. 10/876,336, Final Office Action mailed Aug. 20, 2008", 6 pgs.
"U.S. Appl. No. 10/876,336, Final Office Action mailed Oct. 6, 2009", 7 pgs.
"U.S. Appl. No. 10/876,336, Final Office Action mailed Nov. 4, 2010", 6 pgs.
"U.S. Appl. No. 10/876,336, Final Office Action mailed Nov. 10, 2011", 9 pgs.
"U.S. Appl. No. 10/876,336, Non Final Office Action mailed Jan. 7, 2011", 9 pgs.
"U.S. Appl. No. 10/876,336, Non Final Office Action mailed Mar. 12, 2009", 7 pgs.
"U.S. Appl. No. 10/876,336, Non Final Office Action mailed Apr. 5, 2012", 8 pgs.
"U.S. Appl. No. 10/876,336, Non Final Office Action mailed Jun. 9, 2011", 10 pgs.
"U.S. Appl. No. 10/876,336, Non-Final Office Action mailed Jan. 31, 2008", 8 pgs.
"U.S. Appl. No. 10/876,336, Non-Final Office Action mailed Jul. 21, 2010", 6 pgs.
"U.S. Appl. No. 10/876,336, Notice of Allowance mailed Sep. 5, 2012", 7 pgs.
"U.S. Appl. No. 10/876,336, Pre-Appeal Brief Request filed Apr. 29, 2010", 5 pgs.
"U.S. Appl. No. 10/876,336, Preliminary Amendment filed Aug. 5, 2005", 5 pgs.
"U.S. Appl. No. 10/876,336, Response filed Feb. 10, 2012 to Final Office Action mailed Nov. 10, 2011", 12 pgs.
"U.S. Appl. No. 10/876,336, Response filed Mar. 28, 2011 to Non-Final Office Action mailed Jan. 7, 2011", 12 pgs.
"U.S. Appl. No. 10/876,336, Response filed Jun. 2, 2008 to Non-Final Office Action mailed Jan. 31, 2008", 14 pgs.
"U.S. Appl. No. 10/876,336, Response filed Jun. 12, 2009 to Non Final Office Action mailed Mar. 12, 2009", 8 pgs.
"U.S. Appl. No. 10/876,336, Response filed Aug. 24, 2010 to Non Final Office Action mailed Jul. 21, 2010", 10 pgs.
"U.S. Appl. No. 10/876,336, Response filed Sep. 9, 2011 to Non-Final Office Action mailed Jun. 9, 2011", 15 pgs.
"U.S. Appl. No. 10/876,336, Response filed Nov. 16, 2010 to Final Office Action mailed Nov. 4, 2010", 10 pgs.
"U.S. Appl. No. 10/876,336, Response filed Dec. 7, 2009 to Final Office Action mailed Oct. 6, 2009", 11 pgs.
"U.S. Appl. No. 10/876,336, Response filed Dec. 22, 2008 to Final Office Action mailed Aug. 20, 2008", 11 pgs.
"U.S. Appl. No. 12/414,508, Examiner Interview Summary mailed Aug. 23, 2011", 3 pgs.
"U.S. Appl. No. 12/414,508, Notice of Allowance mailed Jun. 10, 2011", 19 pgs.
"U.S. Appl. No. 12/414,508, Preliminary Amendment mailed May 21, 2009", 4 pgs.
"U.S. Appl. No. 12/414,508, Supplemental Notice of Allowability mailed Jul. 25, 2011", 16 pgs.
"U.S. Appl. No. 13/735,633, Response filed Nov. 19, 2013 to Non Final Office Action mailed Aug. 19, 2013", 10 pgs.
"U.S. Appl. No. 13/735,633, Non Final Office Action mailed Aug. 19, 2013", 9 pgs.
"U.S. Appl. No. 13/735,633, Notice of Allowance mailed Jan. 9, 2014", 8 pgs.
"European Application No. 05762657.4, Office Action mailed Aug. 13, 2010", 5 pgs.
"European Application No. 05762657.4, Office Action received", 4 pgs.
"European Application No. 05762657.4, Office Action Response", 17 pgs.
"European Application No. 05762657.4, Office Action Response filed Feb. 23, 2012", 14 pgs.
"European Application No. 05762657.4, Supplementary European Search Report mailed Jul. 26, 2010", 3 pgs.
"European Application No. 12170903.4, Extended European Search Report mailed Sep. 12, 2013", 6 pgs.
"European Application No. 12170903.4, Response filed Apr. 9, 2014 to Extended European Search Report mailed Sep. 12, 2013", 12 pgs.
"European Application No. 12170904.2, Extended European Search Report mailed Sep. 12, 2013", 6 pgs.
"Regular expression", http://en.wikipedia.org/wiki/Regular_expression, From Wikipedia, the free encyclopedia, (Apr. 3, 2008).
"Regular Expression—Definitions from Dictionary.com", http://dictionary.reference.com/browse/regular%20expression, (2008).
"Regular Expressions—The Single UNIX Specification, Version 2", http://www.opengroup.org/onlinepubs/007908799/xbd/re.html, The Open Group, (1997).
"What is Active Content?", A word definition from the Webopedia Company, (Visited Jun. 13, 2005), 1-2.
Carr, Katherine, "Active content: Friend or foe?", 2002 Sophos Plc., (Jan. 2002), 10 pages.
Cook, Steven, "A Web Developers Guide to Cross-Site Scripting", (Jan. 11, 2003), 16 pgs.
Ioannidis, Sotiris, et al., "Sub-Operating Systems: A New Approach to Application Security", Technical Report MS-CIS-01-06, University of Pennsylvania, (Feb. 2000), 12 pages.
Ismail, et al., "A Proposal and Implementation of Automatic Detection/Collection System for Cross-Site Scripting Vulnerability", IEEE(2004).
Josang, Audun, et al., "Web Security: The Emperors New Armour", Proceedings of the European Conference on Information Systems (ECIS2001), (Jun. 2001), 11 pages.
Schmall, Markus, "Heuristic Techniques in AV Solutions: An Overview", SecurityFocus.com, http://www.securityfocus.com/infocus/1542, (Feb. 2002).
Wallach, Dan S., et al., "Extensible Security Architectures for Java", 16th Symposium on Operating Systems Principles, (Oct. 1997), 26 Pages.
Westermann, Erik, "Learn XML in a Weekend", ISBN 159200-010-x, (Oct. 2002).
Woods, Bob, "Active Internet Content Dangerous—Report", Instant Messaging Planet:Security, (Sep. 19, 2002), 1-2.
Zdziarski, Jonathan, "A Plan for Spam", www.paulgraham.com/spam.html, (Aug. 2002).
"European Application No. 12170904.2, Examination Notification Art. 94(3) mailed Aug. 20, 2015", 4 pgs.
"European Application No. 12170904.2, Response filed Apr. 16, 2014 to Extended European Search Report mailed Sep. 12, 2013", 16 pgs.
U.S. Appl. No. 13/735,633, Preliminary Amendment filed Feb. 5, 2013, 7 pgs.
European Application Serial No. 05762657.4, EPO Communication mailed Nov. 10, 2011, 6 pgs.
European Application Serial No. 12170904.2, Office Action mailed Oct. 21, 2013, 2 pgs.
European Application Serial No. 12170904.2, Response filed Dec. 4, 2015 to Examination Notification Art. 94(3) mailed Aug. 20, 2015, 9 pgs.
International Application Serial No. PCT/US2005/021680, International Preliminary Report on Patentability mailed Jan. 11, 2007.
International Application Serial No. PCT/US2005/021680, International Search Report mailed Sep. 12, 2006, 2 pgs.
International Application Serial No. PCT/US2005/021680, Written Opinion mailed Sep. 12, 2006, 5 pgs.

* cited by examiner

RENDER ENGINE, AND METHOD OF USING THE SAME, TO VERIFY DATA FOR ACCESS AND/OR PUBLICATION VIA A COMPUTER SYSTEM

RELATED APPLICATIONS

This application is a Continuation of U.S. application Ser. No. 13/735,633, filed Jan. 7, 2013, which application is a Continuation of U.S. application Ser. No. 10/876,336, filed Jun. 23, 2004, which application claims the priority benefit of U.S. Provisional Application No. 60/581,857, filed Jun. 21, 2004, which applications are incorporated herein by reference in their entirety.

FIELD OF THE INVENTION

An embodiment relates generally to the technical field of electronic data access and/or publication and, in one exemplary embodiment, to a method and system to verify data received within an electronic communication at a server system.

BACKGROUND OF THE INVENTION

Electronic publishing, and the provision of access to content, has been one of the driving forces behind the explosive growth of the Internet. Two examples of such electronic publishing, and data access, include Internet-based commerce listings (e.g., classified advertisements, online auctions), which allow users to publish information regarding products and services for sale, and web-based e-mail (e.g., HOTMAIL™ and YAHOO! MAIL) that allow people to send electronic communications to other users.

In order to increase the richness of the presentation of information accessible, and communicated, via the Internet, a number of descriptor languages have emerged to support the authoring of content. The most prominent of these are the so-called descriptor formats (e.g., HypeText Markup Language (HTML), eXtensible Markup Language (XML), etc.). These markup languages allow active content to be included within published content or communicated data to be rendered by a browser.

While active content has the potential to enrich the Internet experience, it also presents a number of security problems and vulnerabilities. For example, unscrupulous and malicious users are able to include malicious data (e.g., content) within active content of a web page. Such malicious data may, for example, take the form of a virus that infects the computer system of a user on which a web page is rendered or code that harvests private user information. The combating of "malicious" data presents significant technical challenges to the operators of web-based services. For example, a web-based e-mail service provider may be challenged to exclude malicious data from e-mail communications. Similarly, the operator of a web-based commerce system may be challenged to ensure that listings, available from the commerce service provider's web site, do not contain malicious data. The technical challenges increase as the volume of communications processed by a particular web site increase.

SUMMARY OF THE INVENTION

According to one exemplary embodiment of the present invention, there is provided a method to verify data at a server system. A communication is received at the server system, the communication including the data to be made accessible via the server system. The data is then rendered at the server system. The rendered data is then verified as not being associated with malicious executable code.

Other aspects of the invention will become apparent from the detailed description in combination with the accompanying drawings.

BRIEF DESCRIPTION OF THE DRAWINGS

The present invention is illustrated by way of example, and not limitation, in the figures of the accompanying drawings, in which like references indicate similar elements, and which.

DETAILED DESCRIPTION

A method and system to verify publication data, received in data at a computer system, are described. In the following description, for purposes of explanation, numerous specific details are set forth in order to provide a thorough understanding of the present invention. It will be evident, however, to one skilled in the art that the present invention may be practiced without these specific details.

One embodiment of the present invention is directed to the verification of publication data (e.g., active content) to be published, or otherwise made accessible, via a computer system. In one embodiment, the computer system may operate as a server system in a client-server environment. In other embodiments, the computer system may operate as a peer computer within a peer-to-peer architectured system.

An exemplary embodiment of the present invention is a discussed below as verifying "active content". It will be appreciated that "active content" is merely one example of publication data that may be verified. For the purpose of this specification, the term "active content" shall be taken to include any data that may cause an action or activity to occur when the active content is accessed, received or processed. For example, active content may be data that includes executable code (e.g., a script) that executes responsive to an onload event. Accordingly, active content may include a markup language document (e.g., HTML, XML, etc.), as a markup language document may cause a browser to be redirected to a storage location, and load or run applications. Active content may also include, for example, animated GIFs. Active content may also refer to markup language documents themselves (e.g., web pages that themselves include, or contain references to, an executable script, such as, for example, Java Applets, ActiveX controls, JavaScript, and Visual Basic).

Publication data (e.g., active content) may, for example, be made malicious in two manners. Firstly, a malicious component of active content may be inserted directly into the active content (e.g., as an embedded script). Alternatively, a malicious component of active content may be distinct from data that includes the active content, but may be linked to data (e.g., by a URL that is included within the data). In this case, during a so-called "onload event," a user browser may load a web page, the browser then recognizing the link to the malicious component of the active content, and accordingly fetching the malicious component from a location identified by the URL.

One manner in which to avoid the security risks and problems presented by active content is simply to prohibit active content from being included in communications (e.g., e-mails or listings) received at a computer system. However, this blanket approach is undesirable from a number of points of view, not the least of which being that the rich Internet experience that may be provided by active content is lost.

Figure 1:
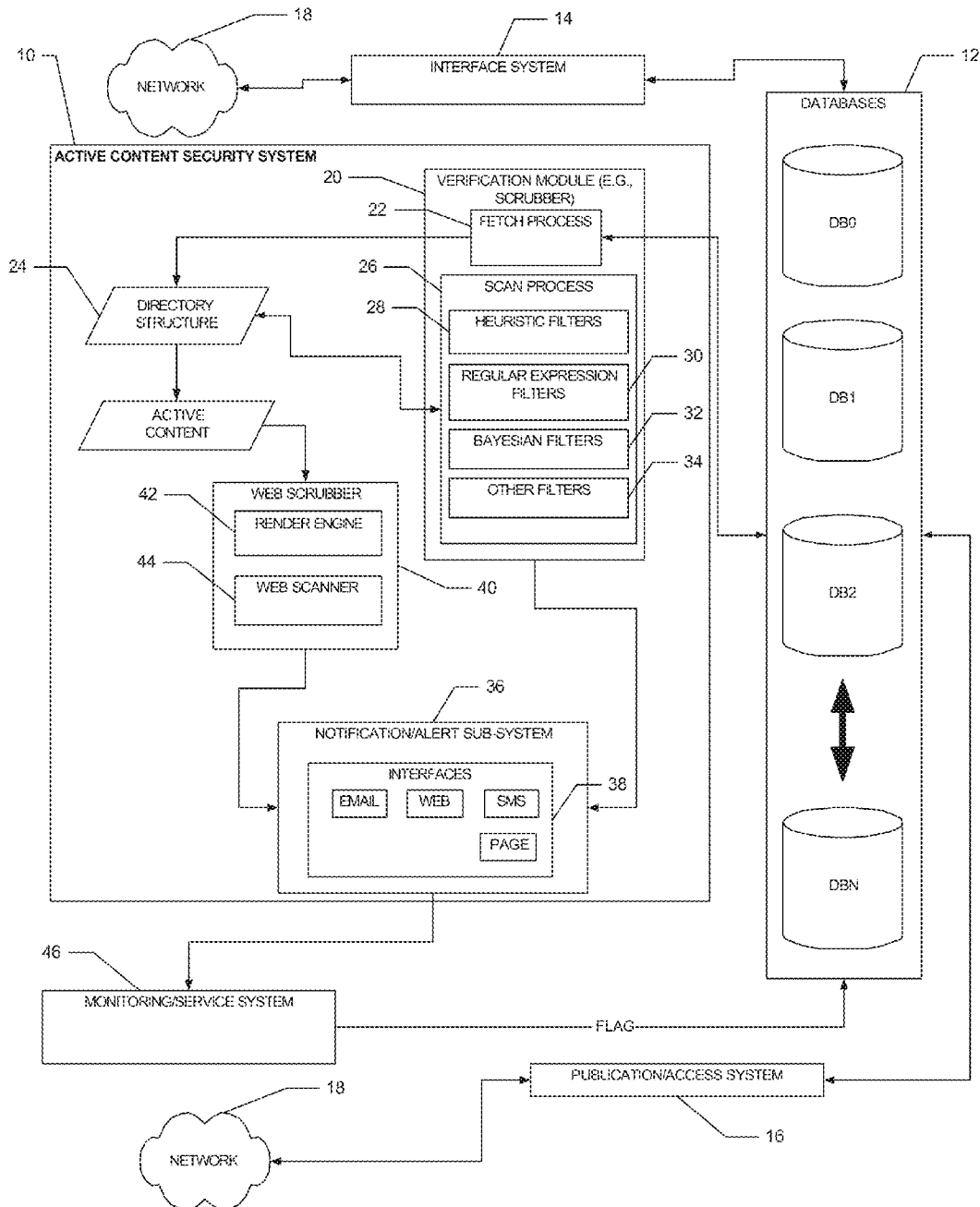
FIG. 1 is a block diagram illustrating the architecture of an active content system, according to an exemplary embodiment of the present invention.

FIG. 1 is a block diagram illustrating an active content security system 10, according to an exemplary embodiment, that may operate as a component of a computer system (e.g., a server computer system of a website), as a supplementary system to work alongside an existing computer system (e.g., a server system), or as a standalone system that provides security services, via a network, to other computer systems. The security system 10, in the exemplary embodiment, is shown to be coupled to one or more databases 12 that are written to via an interface system 14, and from which information may be accessed or published via a publication/access system 16. Each of the interface and publication/access systems 14 and 16 are coupled to a network 18 (e.g., the Internet) so as to enable communications with other systems.

The active content security system 10, in one exemplary embodiment, includes a verification module 20 that includes a fetch process 22. The fetch process 22 queries each of the databases 12 to extract active content therefrom. Consider the example in which the active content security system 10 is deployed in conjunction with a network-based commerce system. In this deployment, the interface system 14 may receive listings, potentially including active content; these listings are then stored within the databases 12. For example, the databases 12 may store listings that are divided amongst the database components according to category. In this example, the fetch process 22 may query the databases 12 to receive active content included in each of the listings within a particular category or subcategory. The fetch process 22 may periodically cycle through each of the categories of listings stored in the database 12. Of course, in other embodiments the resolution with which the fetch process 22 queries the databases 12 may be based on any one or more criterion. The fetch process 22 may furthermore retrieve an entire communication, of which the active content forms merely a part, from the database, as well as other associated information to facilitate processing. Again, considering the example where a received communication is a listing, the fetch process 22 may retrieve the entire listing, an item number allocated to the listing by a network-based commerce site, a time at which the listing was received, a user identifier identifying the seller who added the listing, etc.

Having retrieved active content from the databases 12, the fetch process 22 then caches the retrieved active content within a directory structure 24. Storing the retrieved active within the directory structure 24 enables the active content security system 10 to utilize the inherent abilities of a file system for locking, so as to coordinate and secure accesses by different processes, within the security system 10 to the active content. For example, the file locking capabilities of a low-level operating system may be utilized to ensure that processes do not overwrite each other.

The verification module 20 further includes a scan process 26, which in turn includes one or more filters that are applied to the active content, as stored within the directory structure 24. For example, the filters may include heuristic filters 28, regular expression filters 30, Bayesian filters 32, as well as other custom filters 34. The various filters that constitute the scan process 26 are configured, on one hand, to perform simple scans to identify viruses and associated signatures, within the active content and, on the other hand, also to counter sophisticated obfuscation techniques that may be employed to mask or hide malicious active content. Merely for example, malicious users may include a URL in active content, which appears to point to harmless content. However, the malicious user may associate a script with the URL that, as an onload event, mutates the URL to cause a redirection to malicious content. For example, the malicious user may exploit an embedded mathematical expression in a script that views the provided URL as variables, the script being able to concatenate these variables together in order to generate a new URL that points to malicious content.

The verification module 20 is shown to provide output to a notification module 36. In one embodiment, this output may constitute error codes that are interpreted by the notification module 36 and processed to generate one or more notifications. The notification module 36 includes a number of interfaces (e.g., an e-mail interface, a web interface, an SMS interface and a page interface), and is accordingly able to issue notifications or alerts utilizing any one of a number of media and mechanism. Further, the modification module 36 may be programmed to process different errors in different ways. For example, where the verification module 20 detects a security threat that poses a high risk, the notifications or alerts issued by the notification module 36 may be tailored accordingly. Further, the notification module 36 may include a knowledge management component (not shown) that, based on the type of security threat or error detected, may supplement information communicated in a notification. For example, a notification may include current information regarding a particular threat type, the current information being retrieved from an external database that is updated by others monitoring a particular threat.

The active content security system 10 also includes a web scrubber 40 that, in one embodiment, operates to render active content (e.g., an HTML web page) so as to present the active content security system 10 with a view of the active content as it will be rendered on an end-user's machine. This enables the active content security system 10 to retrieve, analyze and verify content that is not directly included in received data (e.g., a communication), but is nonetheless accessed by the active content as a result of a reference (e.g., a URL) included within the received data. The web scrubber 40 accordingly includes a render engine 42 (e.g., the INTERNET EXPLORER or SAFARI render engines, developed by Microsoft Corporation and Apple Computer, Inc., respectively). The web scrubber 40 further includes a web scanner 44 that deploys one or more filters to detect malicious components of active content. In a further embodiment, the scan process 26 of the verification module 20 and the web scanner 44 may leverage a common set of filters in order to perform their respective functions.

The web scrubber 40, in a manner similar to the verification module 20, provides error codes to the notification module 36, so as to enable the generation and communication of suitable notifications and alerts.

In one embodiment, the notification module 36 may provide notifications and alerts to a monitoring/server system 46 that, based on the notification, may flag one or more data items (e.g., communications), which include active content, within the database 12 as being malicious. The monitoring/server system 46 may employ automated processes to determine whether a particular data item, within the databases 12, should be flagged as being malicious based on an identified error or threat. Further, the monitoring/ server system 46 may include a manual review process, where human operators review the error or the threat notifications, before flagging a particular data item as malicious.

The publication/access system 16, in one embodiment, reviews flags associated with data items stored within the database in order to assess whether to publish or otherwise provide access to a relevant data items. For example, in the exemplary embodiment where the databases 12 support a network-based commerce system, a particular data item in the exemplary form of a listing, which is flagged as being malicious, may be prevented from being accessible (e.g., either by search, browsing or otherwise) via the publication/ access system 16.

Figure 2:
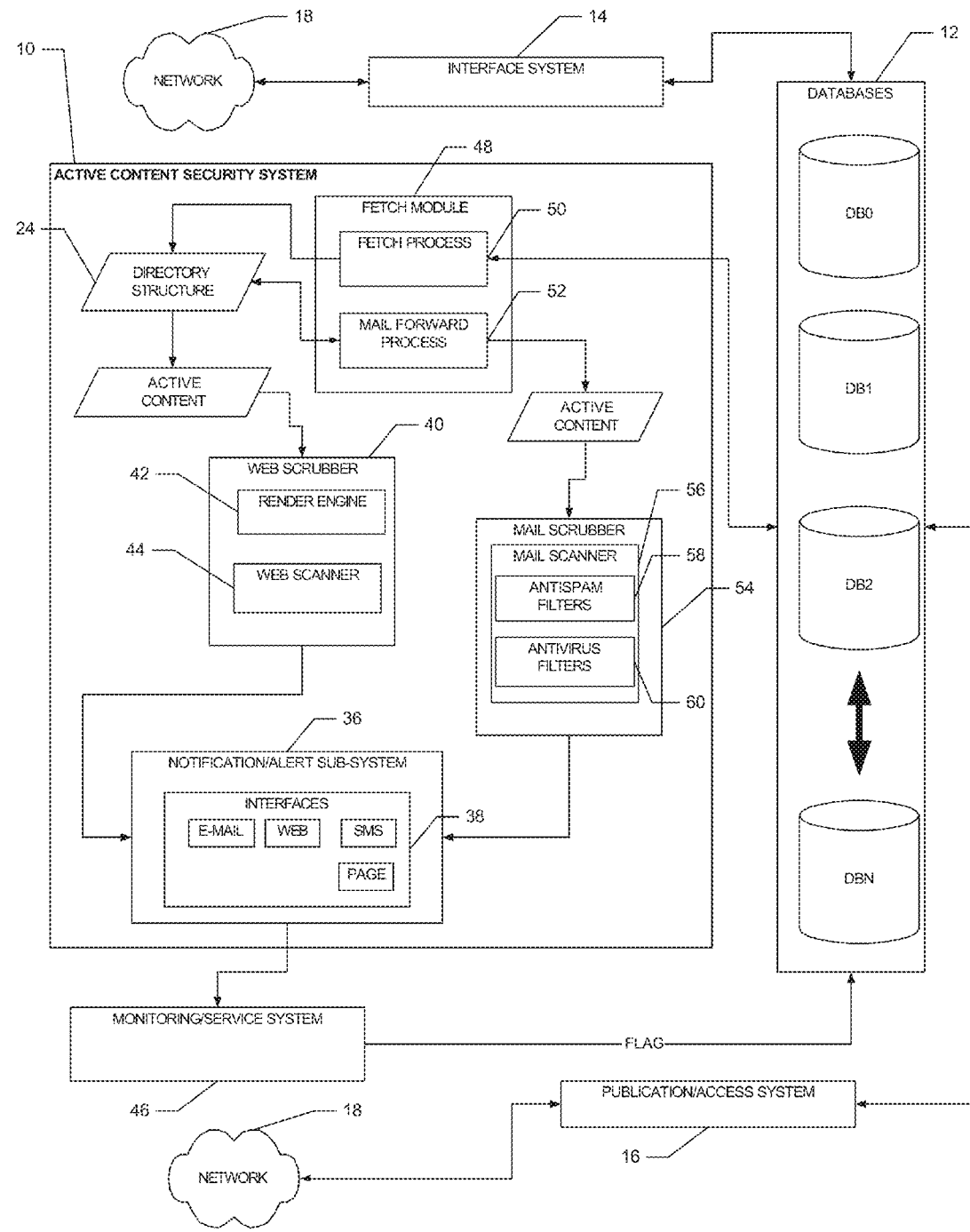
FIG. 2 is a block diagram illustrating the architecture of an active content security system, according to a further embodiment of the present invention.

FIG. 2 is a block diagram illustrating a further exemplary embodiment of an active content, in which the verification module 20, of the embodiment illustrated in FIG. 1, is replaced by a fetch module 48 that includes a fetch process 50 and a mail forward process 52. The fetch process 50 operates in substantially the same manner as the fetch process 22 described above, to create a directory structure 24. The mail forward process 52 pulls active content (e.g., a listing) from the directory structure 24, and forwards the active content as an e-mail communication to a mail scrubber 54, which in turn includes a mail scanner 56. The mail scanner 56 may deploy a number of filters, such as, for example, anti-spam filters 58 and anti-virus filters 60. These filters, in various embodiments, could again constitute heuristic, regular expression, Bayesian and other filter types. The mail scrubber 54 then communicates any threats or errors detected by the mail scanner 56 to the notification module 36.

Figure 3:
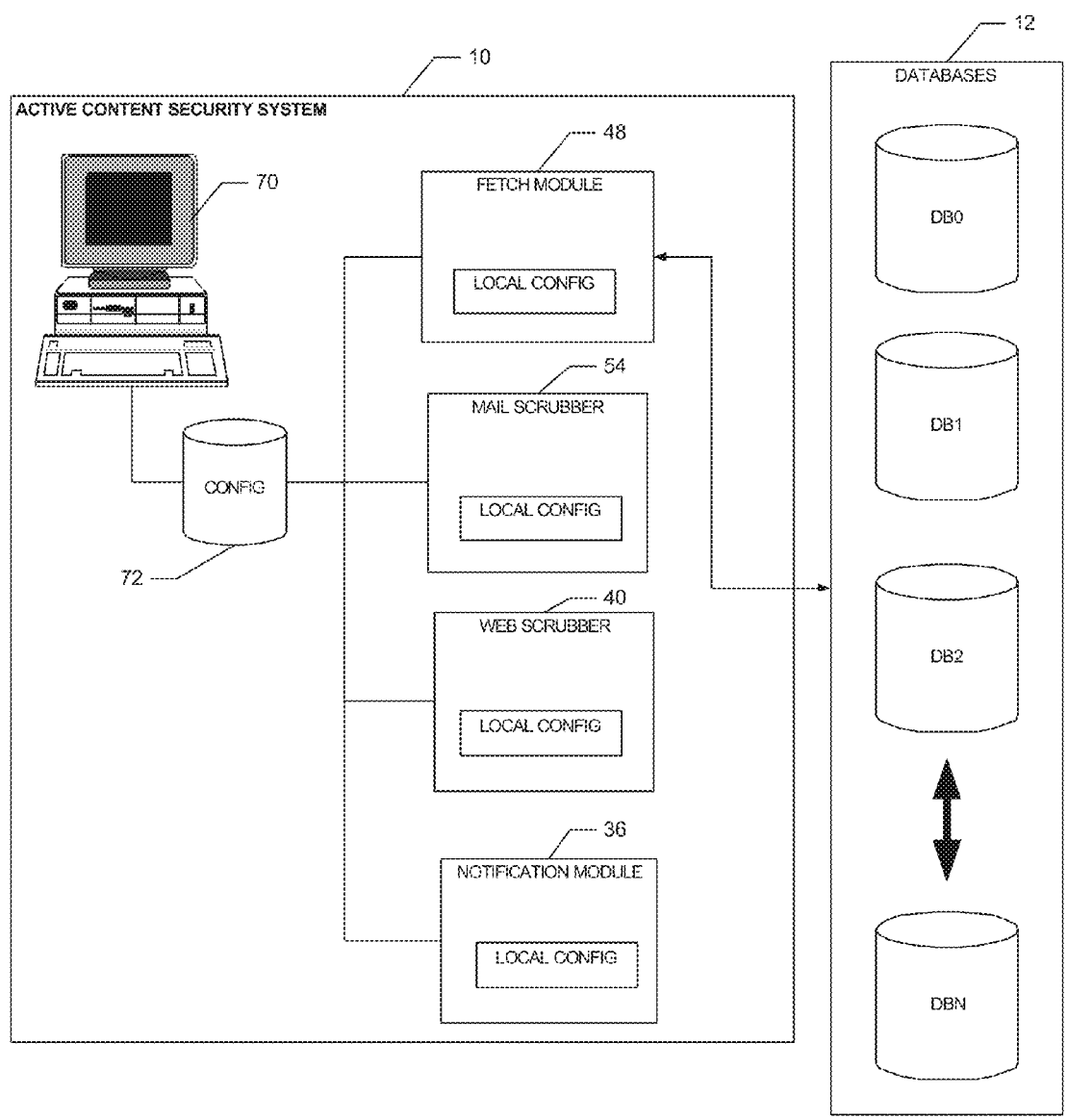
FIG. 3 is a block diagram illustrating a configuration console, which may be deployed in conjunction with, or as part of, an active content security system, according to an exemplary embodiment of the present invention.

The exemplary embodiment illustrated in FIG. 3 exhibits a more modular architecture than the exemplary embodiment illustrated in FIG. 1, and may exhibit better scalability in certain environments. For example, the mail scrubber 54 may be implemented utilizing an array of servers, with the mail forward process 52 communicating e-mail messages, including the active content, to the array of servers in a load-balanced manner.

FIG. 3 is a block diagram illustrating the architecture of a centralized management interface 70, according to an exemplary embodiment, that may be utilized to upload different configurations to the various modules and components of the active content security system 10. A central management interface (or console) 70 allows for the specification and uploading of different configurations for each of the major components of the active content security system 10 (e.g., the fetch module 48, the mail scrubber 54, the web scrubber 40, and the notification module 36) to a configuration database 72. Local configuration files, maintained on each of the components, are then synchronized with configuration files maintained within the database 72. The console 70 provides a central place for the modifying, changing, deleting and modifying of configuration files for each of the components. The configuration files may, in one embodiment, specify the parameters and mechanisms to be employed by the various filters of the mail scrubber 54 and the web scrubber 40, for example. A local configuration file for the fetch module 48 may furthermore specify the manner in which active content is to be retrieved from the databases 12, as well as a schedule for cycling through the various databases 12. A local configuration file for the notification module 36 may similarly specify the manner and timing of the issuance of notifications and alerts from the notification module 36.

Figure 4:
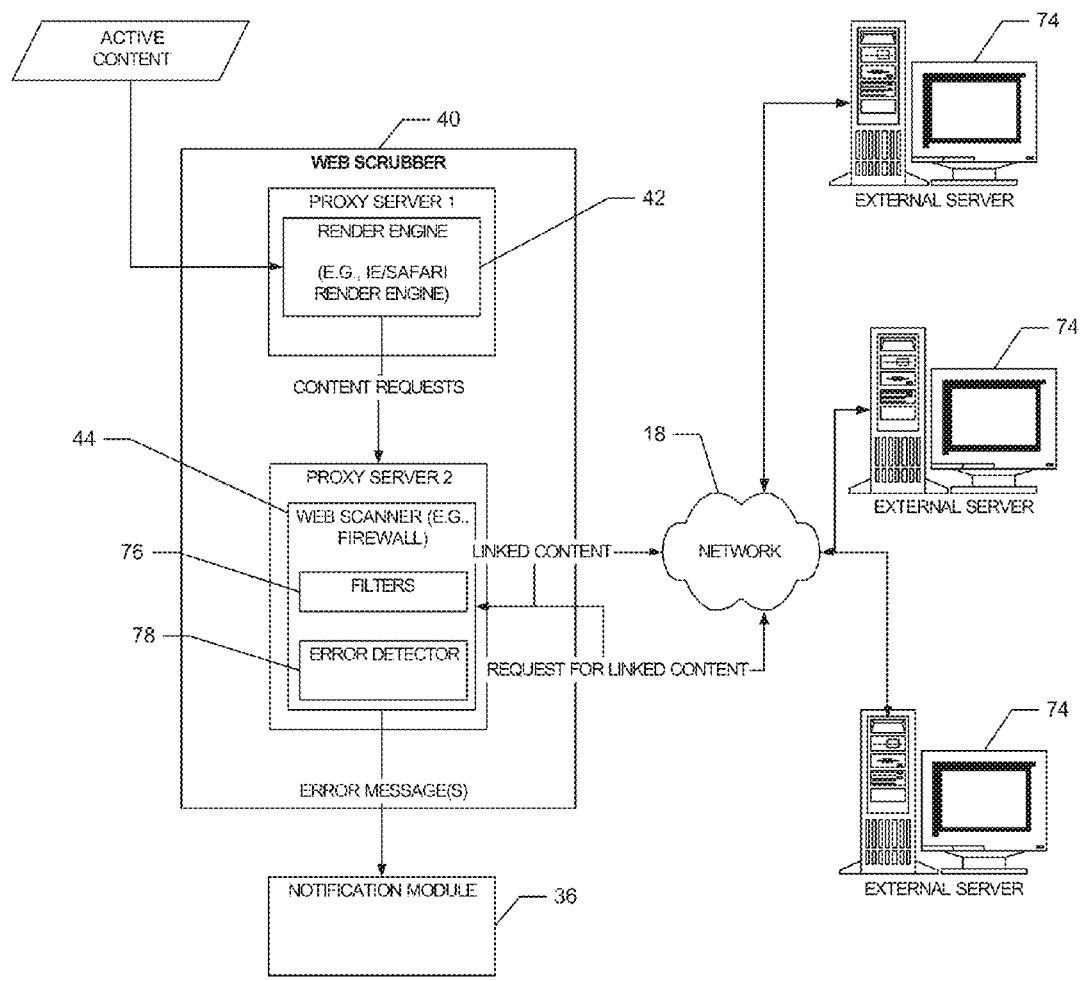
FIG. 4 is a block diagram providing architectural detail regarding a web scrubber component of an active content security system, according to an exemplary embodiment of the present invention.

FIG. 4 is a block diagram providing further details regarding the architecture of the web scrubber 40, according to one exemplary embodiment. FIG. 4 illustrates that the render engine 42 and the web scanner 44 (e.g., a web application firewall) may each reside on a respective proxy server. The render engine 42 is shown to receive active content (e.g., an HTML page), and to render this content. The rendering of the content may include the issuance of requests to external servers for data (e.g., content, executable code, etc.) that resides on these servers 74. Specifically, consider that active content in exemplary form of an HTML page may identify a location on an external server 74 from which content is to be retrieved and displayed or executed within the context of the HTML document. During the rendering process, the render engine 42, on encountering any data (e.g., content) on the HTML page that is externally referenced (e.g., by a URL), will issue a request for the externally referenced data to the external server 74.

FIG. 4 illustrates that such a content request is routed to an external server 74 via the web scanner 44, resulting in the external servers 74 returning the requested data via the web scanner 44 back to the render engine 42. This provides the web scanner 44 with the opportunity to employ filters 76 and error detection mechanisms 78 to verify that the requested data, as part of the rendered active content, is not malicious (e.g., is not a malicious executable code or script). The web scanner 44 may or may not communicate the requested data to the render engine 42 upon detection of malicious data, or on the verification that the requested data is in fact not malicious.

Figure 5:
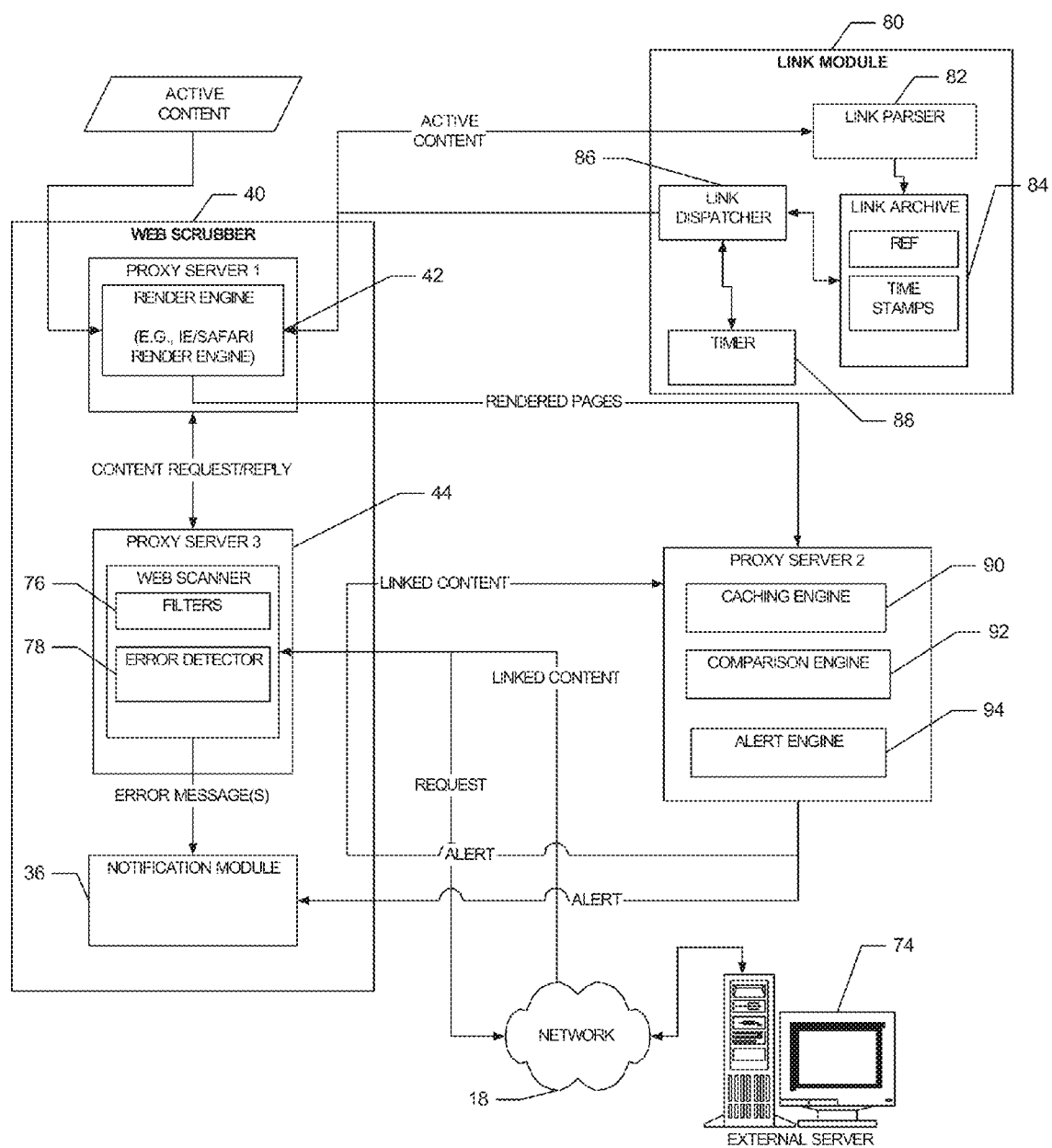
FIG. 5 is a block diagram illustrating a further exemplary embodiment of an architecture of a web scrubber component that may be deployed as part of an active content security system.

FIG. 5 is a block diagram illustrating a further exemplary embodiment of components that may be incorporated within the active content security system 10. The embodiment illustrated in FIG. 5 differs from that illustrated in FIG. 4, in that, in one embodiment, the render engine 42 communicates all rendered data (e.g., rendered pages) to a caching engine 90 that caches a "reference" copy of the rendered data for later comparison, by a comparison engine 92, to a later rendered version of the rendered data. In an alternative embodiment, as opposed to caching the entire rendered data, the web scanner 44 may communicate linked data received from an external source (e.g., an external sever 74) to the caching engine as a "reference" copy of linked data, which may be compared to a subsequently retrieved version of the linked data by the comparison engine 92.

Referring to FIG. 5, a reference module, in the exemplary form of a link module 80, is shown to include a reference parser, in the exemplary form of a link parser 82, that receives the active content from the render engine 42, and parses all links (e.g., URLs) included in the active content to data that is linked to by the active content. The link parser 80 then stores all identified links within a link archive 84 for later dispatch, by a link dispatcher 86, back to the render engine 42. The link module 80 also includes a timer 88 whereby the timing of the dispatching of links from the link dispatcher 86 to the render engine 42 is controlled.

In a further embodiment, the link parser 82 may form part of the web scrubber 40, and the web scrubber 40 may simply communicate links, identified within active content, to the link module 80 for archiving within the link archive 84.

In addition to simply archiving a record of the actual link, the link archive 84 also includes a time stamp indicating the date and time information for when data (e.g., a communication, such as a listing) was received at a specific system, as well as a time stamp indicating the time and date at which the link dispatcher 86 last communicated the relevant link through to the render engine 42.

The link module 80 operates to maintain an archive of links, and associated time/date information, so as to enable the active content security system 10 to repetitively and periodically verify that the data, associated with the link and potentially stored at an external server location, has not been changed by a malicious user subsequent to an initial verification by the active content security system 10. For example, a malicious user, being aware that the active content security system 10 will perform an initial verification with respect to externally stored content referenced by active content received at a system, may for an initial period associate benevolent data with the link. After a predetermined time, having assumed that an initial verification by the active content security system 10 has been performed, the malicious user may then substitute the benevolent content with malicious content. The link module 80 operates in conjunction with the web scrubber 40 to provide a continual monitoring of external content that is referenced by active content published by a system (e.g., a network-based commerce system).

The link module 80 may accordingly, by issuing a link from a link dispatcher 86 to the render engine 42, request and initiate a verification process that utilizes the render engine 42 as a proxy for the link module 80. The render engine 42 in turn utilizes the web scanner 44 as a proxy, the web scanner 44 requesting linked data (e.g., linked content) from an external server 74 via the network 18. The linked content will then be returned to the web scanner 44 that employs the filters 76 and error detection mechanisms 78 to scan the linked content. The requested files (or appropriate error codes) are then returned from the web scanner 44 to the render engine 42.

In one embodiment, a rendered page, including the linked content, is then provided to a further proxy server that hosts a caching engine 90, a comparison engine 92, and an alert engine 94. As noted above, in the embodiment illustrated in FIG. 5, the render engine 42 may deliver rendered pages content (e.g., rendered pages) to the caching engine for cached storage. The comparison engine 92 operates to compare a previously stored version of rendered content with a newly received version of the rendered content to determine whether the content differs. Should the originally rendered version of the active content differ from a subsequently rendered version of the active content, this indicates that the content received from the external server, and associated with a particular reference, may have been substituted for malicious purposes. Accordingly, the alert engine 94 may generate an appropriate indication to the notification module 36 in the event the comparison detects such a variance.

In a further embodiment, the web scanner 44 may provide the retrieved linked data directly to the proxy caching engine 90 which, as opposed to storing an entire copy of rendered content, only stores the data that is retrieved from an external source (e.g., an external server 74). The comparison engine 92, it will be appreciated, may then perform a comparison between data previously received, and cached, from a location identified by a link with newly retrieved data from that location. Again, should the comparison engine 92 detect a delta between the previously archived content and the newly retrieved data, the alert engine 94 may issue an appropriate alert to the notification module 36.

Figure 6:
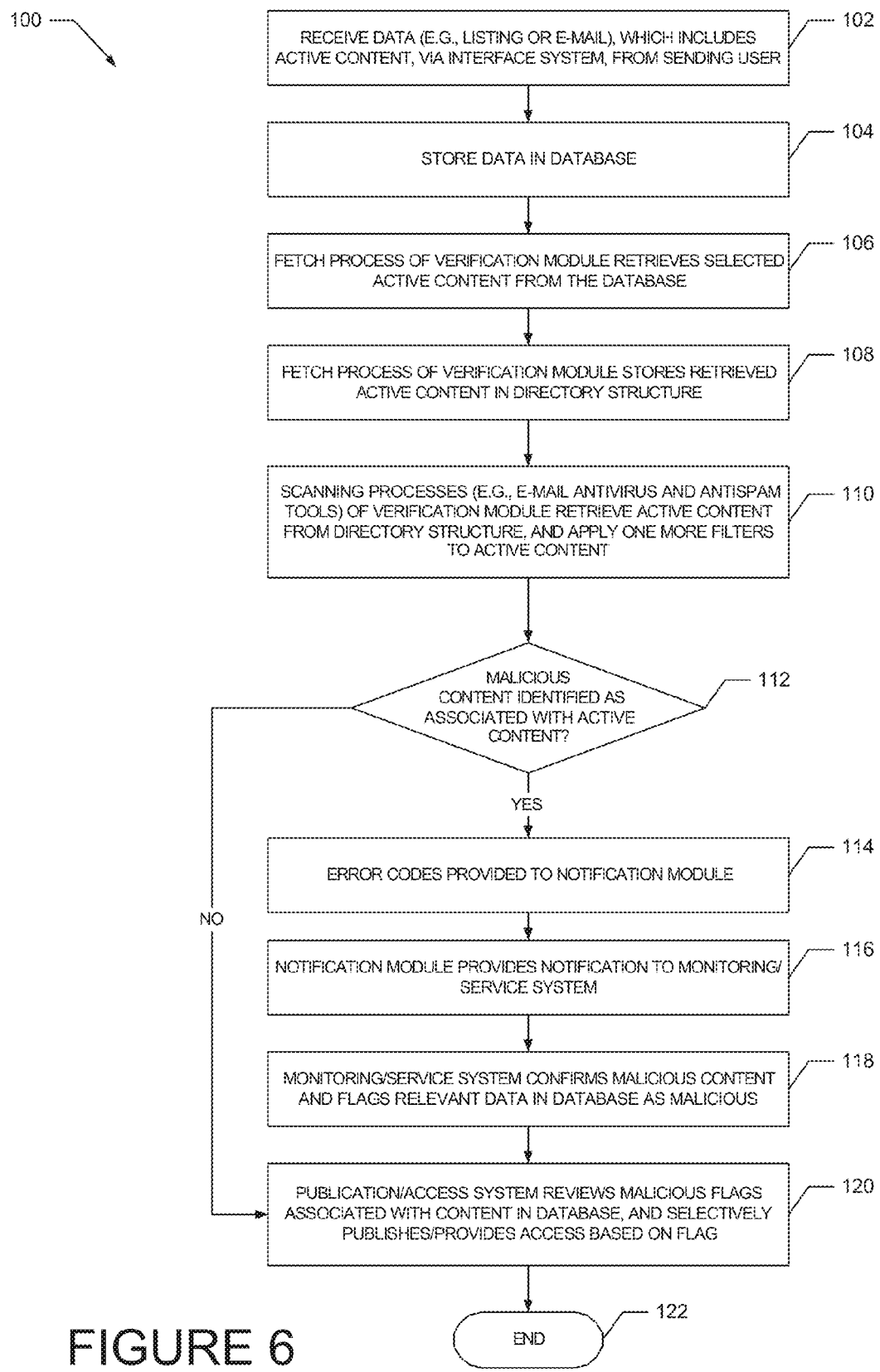
FIG. 6 is a flowchart illustrating a method, according to an exemplary embodiment, to verify active content to be published (or otherwise made accessible) by a computer system.

FIG. 6 is a flowchart illustrating a method 100, according to an exemplary embodiment, to verify active content to be published or accessed via a server system. At block 102, data is received at a server system (e.g., in the form of a listing received at a network-based commerce system or an e-mail received at a network-based email system), the received data including active content. The data may be received, for example, via the interface system 14 from a sending user (e.g., a seller that has offered a listing). The data is then stored, at block 104, within the database 12, whereafter the fetch process 22, as described above in reference to FIG. 1, retrieves a selected active content from the database 12. At block 108, the fetch process 22 stores the retrieved active content in the directory structure 24. At block 110, scanning processes (e.g., the scan process 26) of the verification module 20 retrieve the active content from the directory structure 24, and apply one or more filters to the active content in an attempt to identify malicious components thereof.

At decision block 112, the verification module 20 makes a determination whether any malicious content is identified as having been associated with the active content under consideration. If so, at block 114, appropriate error codes, which identify the nature of the malicious content, are communicated to the notification module 36, which at block 116, issues an appropriate notification/alert to the monitoring/server system 46. At block 118, the monitoring/server system 46 performs a confirmation operation regarding the malicious content, and flags the relevant data, which included the malicious active content, in the databases 12. Accordingly, the flagging of the data identifies the data as including malicious active content.

At block 120, the publication/access system 16 identifies the "malicious" flags associated with various data items in the databases 12, and selectively publishes, or provides access, to data within the databases 12 based on the settings of the "malicious" flags. For example, where the databases 12 store data in the form of listings for a network-based commerce system, the publication/access system 16 may, responsive to a search request against the databases 12, exclude data items for which "malicious" flags have been set from a search result return responsive to such a search query. Further, the publication/access system 16 may simply prevent any processes of a network-based commerce system from exposing a data item that has been flagged as being malicious.

Returning to decision block 112, in the event that the active content under scrutiny is not identified as having any malicious content associated therewith, the method 100 skips the operations performed at blocks 114-118, and accordingly a "malicious" flag is not set for the relevant content. At block 120, the publication/access system 116 may allow access (or publication) of the data item associated with the active content under scrutiny.

Figure 7:
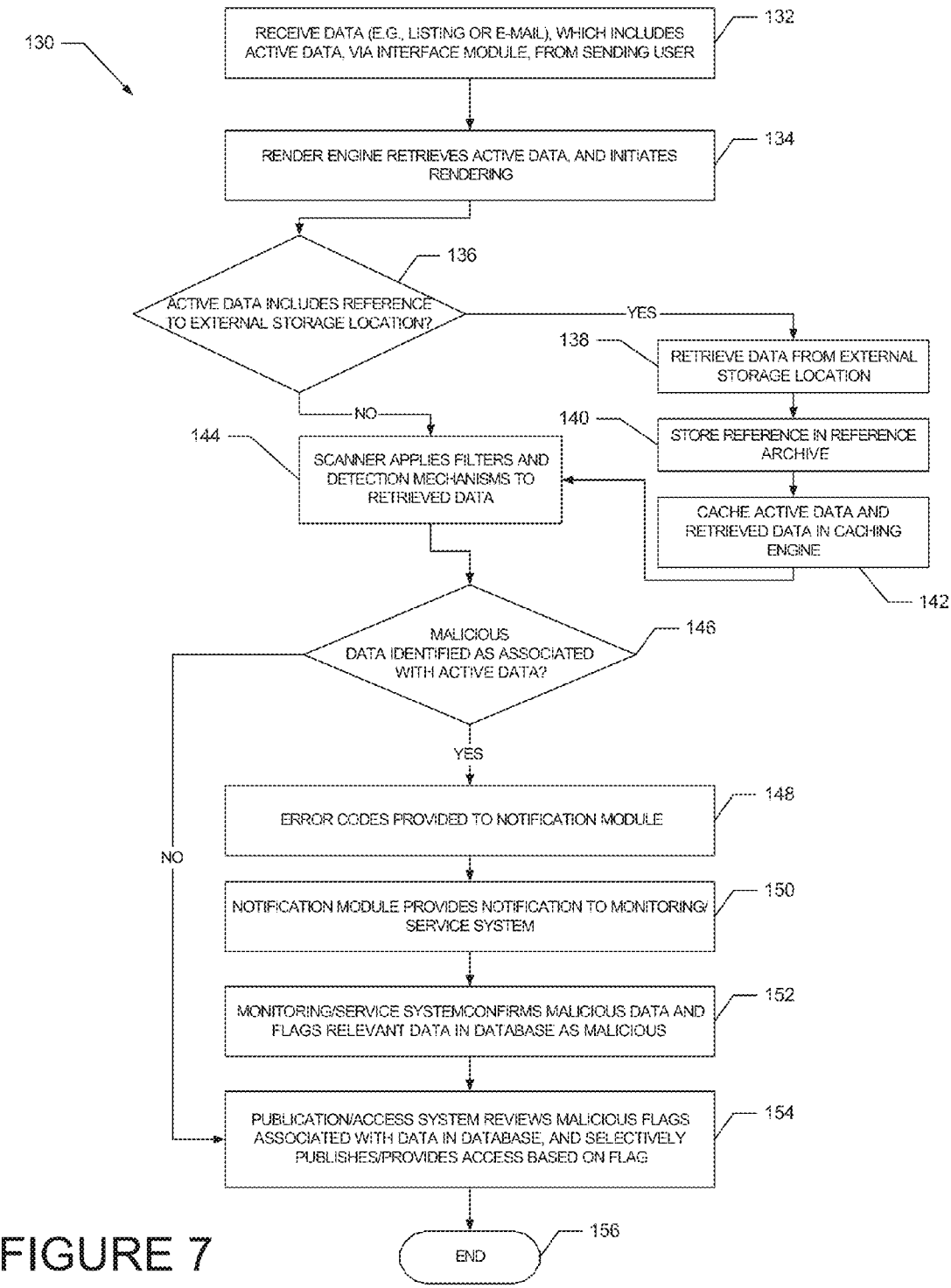
FIG. 7 is a flowchart illustrating a method, according to an exemplary embodiment, to verify active content at a computer system.

FIG. 7 is a flowchart illustrating a method 130, according to an exemplary embodiment, to verify active content at a server system (e.g., a network-based commerce system). The method 130 commences at block 132, with the reception of received data (e.g., a listing or an email) via an interface system 14, the received data including active content. At block 134, the render engine 42 retrieves the active content (e.g., from the directory structure 24) and initiates rendering thereof. At decision block 136, the render engine 42 makes a determination whether the active content includes a reference (e.g., a URL or other link) to an external storage location from which further data is to be retrieved.

If so, at block 138, the render engine 42 initiates a process to retrieve the data from the external storage location. To this end, the render engine 42 may issue a data request to the external server 74. At block 140, the render engine 42, as illustrated in FIG. 5, may also cause the reference (e.g., the URL) to be stored in an archive (e.g., the link archive 84), and may also cache the active content, and the data retrieved from the external location, within the caching engine 90. It will be appreciated, from the above descriptions with reference to FIG. 5, that the caching of the active content, as well as the retrieved data, within the caching engine 90 is for the purposes of creating a "reference" version of the active content and/or the retrieved data so as to enable the "reference" version to be compared against subsequently retrieved versions of this data, so as to enable detection of a modification to the external data associated with the reference.

In the event that the active content does not include a reference to an external storage location (decision block 136), or subsequently to the caching operation performed at block 142, at block 144 the web scanner 44 applies various filters and detection mechanism to the retrieved data.

At decision block 146, the web scanner 44 makes a determination whether malicious content was identified, by any other filters, as being associated with the active content (e.g., that the retrieved data itself constituted malicious active content). If so, at block 148, the web scanner 44 communicates appropriate error codes to the notification module 36, which, in turn at block 150 provides a notification to the monitoring/server system 46. The monitoring/server system 46, at block 152, may perform further scrutiny of the allegedly malicious content, and based on that scrutiny, flag the relevant data within the database 12 as being malicious, if the scrutiny confirms the malicious nature of the content.

At block 154, the publication/access system 16 then reviews "malicious" flags associated with the data in the database 12, and selectively publishes, or provides access to, this data based on the settings of the "malicious" flags.

Similarly, at decision block 146, if it is determined that no malicious content is associated with the active content under scrutiny, the method 130 skips the operations performed at blocks 148-152, and progresses to block 154. The method 130 then terminates at block 156.

Figure 8:
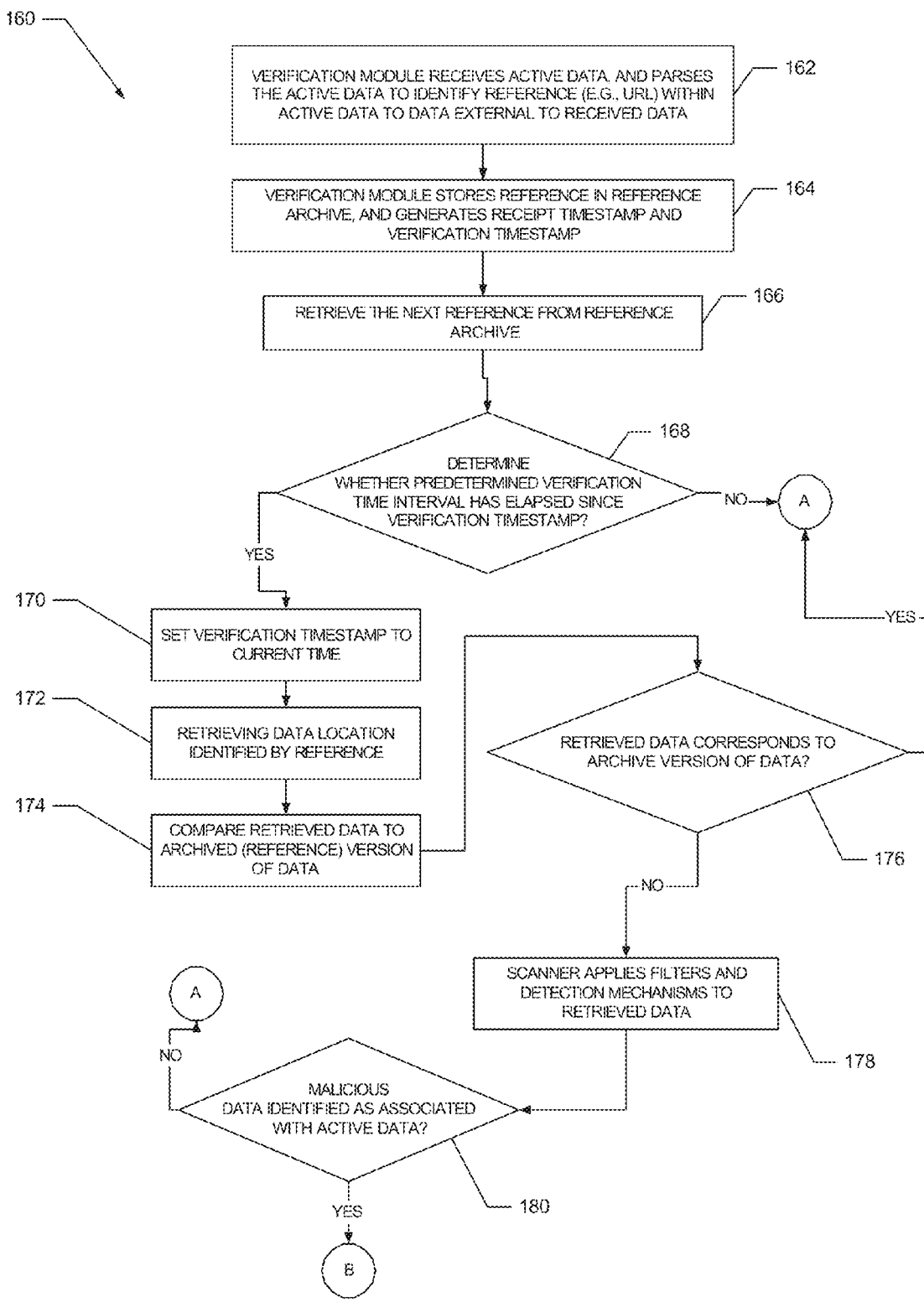
FIGS. 8-9 are flowcharts illustrating a further exemplary method, according to one embodiment, to verify active content at a computer system.
Figure 9:
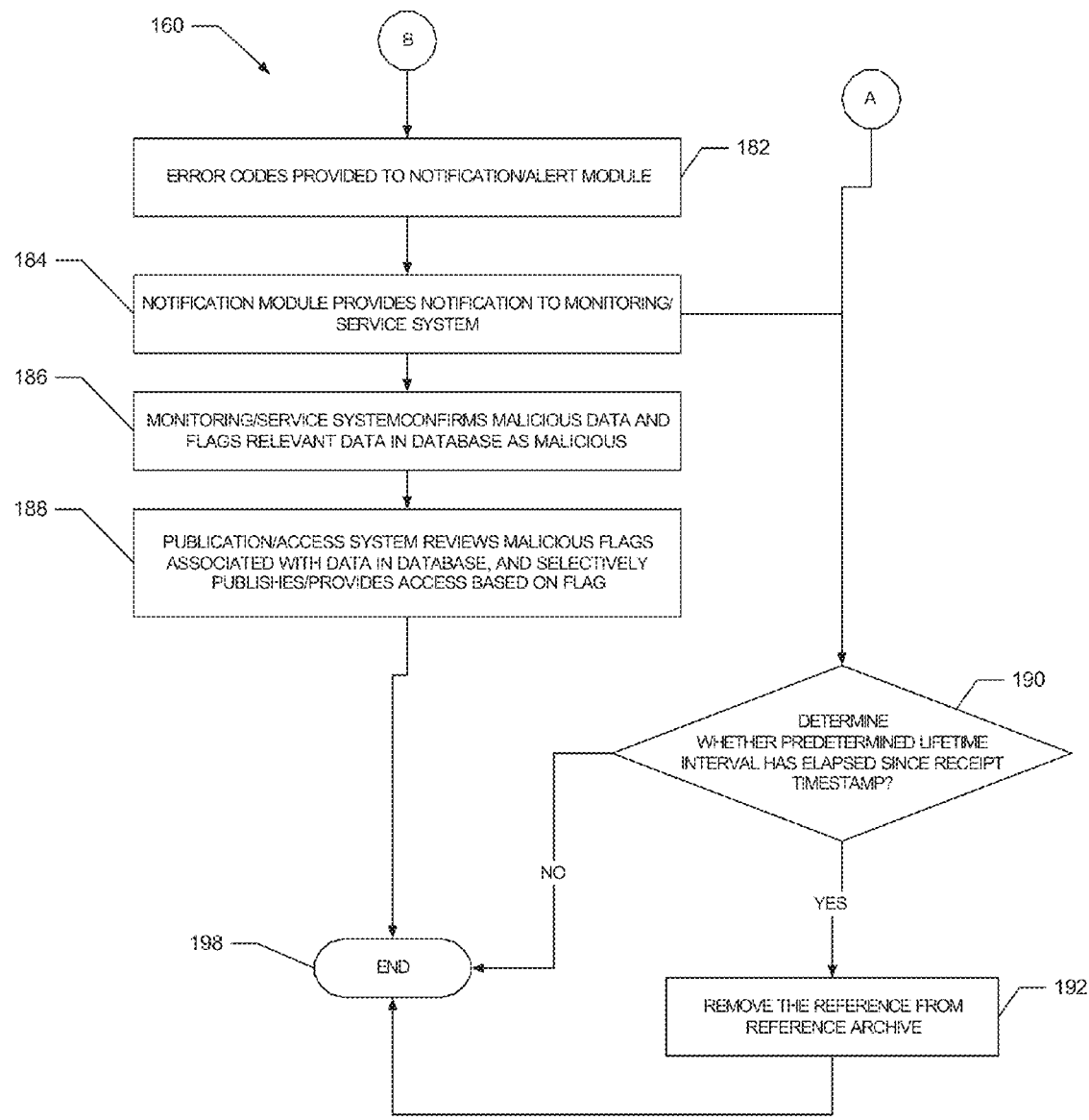

FIGS. 8 and 9 are a flowchart illustrating a method 160, according to an exemplary embodiment, to verify content at a computer system (e.g. a server system associated with a network-based commerce system). The method 160 commences at block 162 with the retrieval, by the verification module 20 of active content, and the passing, by the link parser 82 of the active content to identify references (e.g., links in the form of URLs) within the active content data external to data previously received by the interface system 14 and stored within the databases 12.

At block 164, the verification module 20, and more specifically, link archive 84, stores the identified references together with a receipt time stamp (e.g., indicating a date/time at which the data was received by the interface system 14), and a verification time stamp indicating a time at which the relevant reference was last verified. For an initial verification operation, the verification time stamp may be set to the date/time at which the fetch process 22 retrieved the active content from the databases 12.

It will be appreciated that the operations performed at block 162 and 164 may correspond to the operations performed at block 140, as described above with reference to FIG. 7. The operations are performed at blocks 166-198, as described below, reference specifically operations performed by the link module 80.

At block 166, the link module 80 retrieves a next reference (e.g., URL) to be verified from the link archive 84, and at decision block 168 determines whether a predetermined verification time interval has elapsed since the last verification time stamp. Specifically, the link dispatcher 86 may compare the verification time stamp, associated with the reference under scrutiny, with a current time in order to perform the determination at decision block 168.

Following a positive determination at decision block 168, the link dispatcher 86 then sets the verification time stamp to the current date/time, and proceeds to dispatch the reference under scrutiny to the render engine 42, which acts as a proxy of the link module 80. The render engine 42, in turn, issues a request for the retrieval of data from the relevant reference, this request being issued via the web scanner 44 to, for example, an external server 74 via the network 18. The external server 74 then returns the data, which resides at a location identified by the reference to the web scanner 44. The web scanner 44 then communicates the retrieved data (e.g., the linked content) to the caching engine 90 at block 174.

At decision block 176, the comparison engine 92 then performs a comparison between the retrieved data and a "reference" archived version of the retrieved data to determine whether the newly retrieved data corresponds to the "reference" archived version of the data.

In the event that the newly retrieved data is found not to correspond to the "reference" archived version, at block 178, the alert engine 94 issues an appropriate notification to the web scanner 44, which then again applies the appropriate filters and detection mechanisms to the newly retrieved data to determine whether the newly retrieved, and modified, data is malicious. In this manner, it will be appreciated that, by performing the comparison between the archived and newly retrieved data, the scanning operations performed by the web scanner 44 are only performed in the event that the data associated with a particular reference is determined to have been modified subsequent to a previous verification operation. The scanning operations, performed by the web scanner 44, may be computationally expensive. By only performing the scanning operations under these circumstances, the demand placed on the web scanner 44 may be limited to those situations where data associated with a reference has in fact changed since a previously performed verification operation with respect to the relevant reference. Accordingly, this allows the active content security system 10 to regularly and periodically verify data, without requiring that the web scanner 44 operate for each such regular and periodic verification operation.

Returning to the method 160, at block 180, in the event that malicious content is identified as being associated with the active content (e.g., the newly retrieved data is identified as being malicious), the method 160 progresses to block 182, with the web scanner 44 providing appropriate error codes to the notification module 36. At block 184, the notification module 36 provides appropriate notification to the monitoring/server system that, at block 186, in turn confirms the malicious nature of the newly retrieved data and may then set the "malicious" flag associated with the content in the database 12.

At block 188, as described above with reference to FIG. 7, the publication/access system 16 may then examine "malicious" flags associated with data in the database 12, and selectively publish, or provide access, to data based on the settings of relevant "malicious" flags. Subsequent to block 188, at block 198, the method 160 may terminate.

Returning to FIG. 8, following a negative determination at decision block 168, or a positive determination at decision block 176, and, referring to FIG. 9, following operations performed at block 184, the method 160 progresses to decision block 190, to perform a housekeeping function with respect to references in the link archive 84. In one embodiment, at block 190, the link archive 84 may determine whether a predetermined lifetime interval has elapsed since the received time stamps associated with a particular reference. This determination is for housekeeping purposes, and for removing references from the link archive 84. In the exemplary embodiment in which the active content security system 10 is operating in conjunction with a commerce system, the lifetime interval may be set to the maximum time period (e.g., 10 days) for which a commerce listing (e.g., an auction listing) may be valid. For example, where the time/date difference between the received time stamp and a current date/time, as specified by the timer 88, exceeds 10 days, the method may progress to block 190, where the relevant reference is removed following the operations performed at block 192, following a negative determination at decision block 190, the method again progresses to block 198, where the method 160 terminates.

In an alternative embodiment, the housekeeping operation performed at block 190 may use other criterion to remove a reference from the link archive 84. Where the active content security system 10 is deployed in conjunction with a commerce system, the link archive 84 may determine that a listing, within which a particular reference is incorporated, is no longer valid or extant for a reason other than the expiration of a lifetime. For example, the link archive 84 may determine whether an item associated with a listing has been sold, or where an auction listing has expired or has been otherwise terminated. A based on such determinations, the link archive 84 may then remove a reference from the link archive 84.

Figure 10:
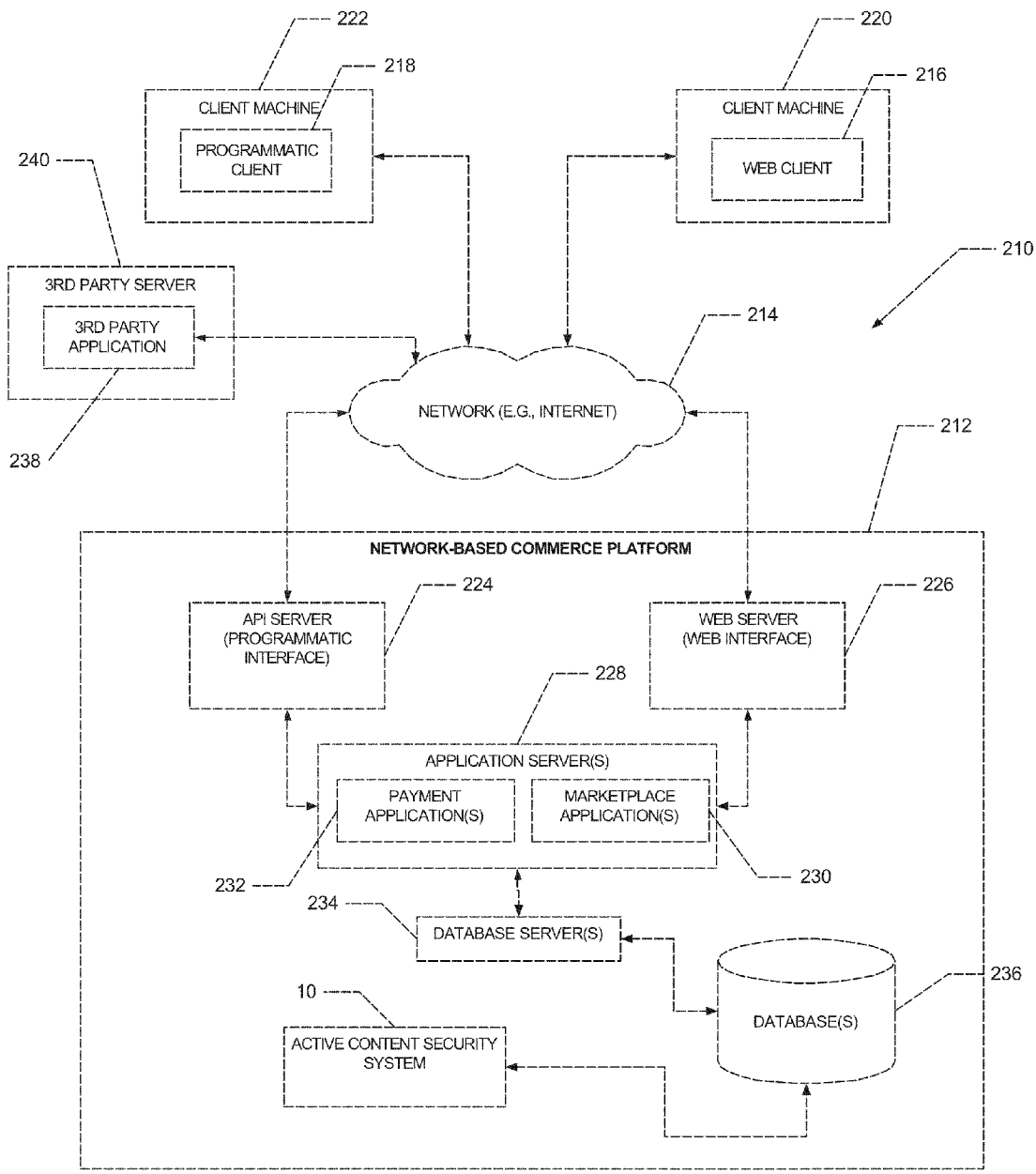
FIG. 10 is a network diagram depicting a commerce system, according to an exemplary embodiment, having a client-server architecture.

FIG. 10 is a network diagram depicting a commerce system 210, according to one exemplary embodiment, having a client-server architecture. An exemplary active content security system 10 is shown to form part of the commerce system 212. Specifically, a commerce platform, in the exemplary form of a network-based marketplace 212, provides server-side functionality, via a network 214 (e.g., the Internet) to one or more clients. FIG. 10 illustrates, for example, a web client 216 (e.g., a browser, such as the Internet Explorer browser developed by Microsoft Corporation of Redmond, Wash. State), and a programmatic client 218 executing on respective client machines 220 and 222.

Turning specifically to the network-based marketplace 212, an Application Program Interface (API) server 224 and a web server 226 are coupled to, and provide programmatic and web interfaces respectively to, one or more application servers 228. The application servers 228 host one or more marketplace applications 230 and payment/redemption applications 232.

The application servers 228 are, in turn, shown to be coupled to one or more databases servers 34 that facilitate access to one or more databases 236. The active content security system 10 is shown to be coupled to the databases 236, and accordingly, in one exemplary embodiment, to operate in the manner described above with respect to data items contained within the databases 236.

The marketplace applications 230 provide a number of promotional, loyalty and marketplace functions and services to user that access the marketplace 212. The payment/redemption applications 232 likewise provide a number of payment and redemption services and functions to clients that access marketplace 212. Specifically, the payment/redemption applications 230 allow users to quantify for, and accumulate, value in accounts, and then later to redeem the accumulated value for products (e.g., goods or services) that are made available via the marketplace applications 230. While the marketplace and payment/redemption applications 230 and 232 are shown in FIG. 10 to both form part of the network-based marketplace 212, it will be appreciated that, in alternative embodiments, the payment/redemption applications 232 may form part of a promotion or loyalty service that is separate and distinct from the marketplace 212.

Further, while the system 210 shown in FIG. 10 employs a client-server architecture, the present invention is of course not limited to such an architecture, and could equally well find application in a distributed, or peer-to-peer, architecture system. The various marketplace and payment applications 230 and 232 could also be implemented as standalone software programs, which do not necessarily have networking capabilities.

The web client 216, it will be appreciated, accesses the various marketplace and payment/redemption applications 230 and 232 via the web interface supported by the web server 226. Similarly, the programmatic client 218 accesses the various services and functions provided by the marketplace and payment/redemption applications 230 and 232 via the programmatic interface provided by the API server 224. The programmatic client 218 may, for example, be a seller application (e.g., the TURBO LISTER application developed by eBay Inc., of San Jose, Calif.) to enable sellers to author and manage listings on the marketplace 212 in an off-line manner, and to perform batch-mode communications between the programmatic client 218 and the network-based marketplace 212.

FIG. 10 also illustrates a third party application 238, executing on a third party server machine 240, as having programmatic access to the network-based marketplace 212 via the programmatic interface provided by the API server 224. For example, the third party application 238 may, utilizing information retrieved from the network-based marketplace 212, support one or more features or functions on a website hosted by the third party. The third party website may, for example, provide one or more promotional, marketplace or payment/redemption functions that are supported by the relevant applications of the network-based marketplace 212.

Figure 11:
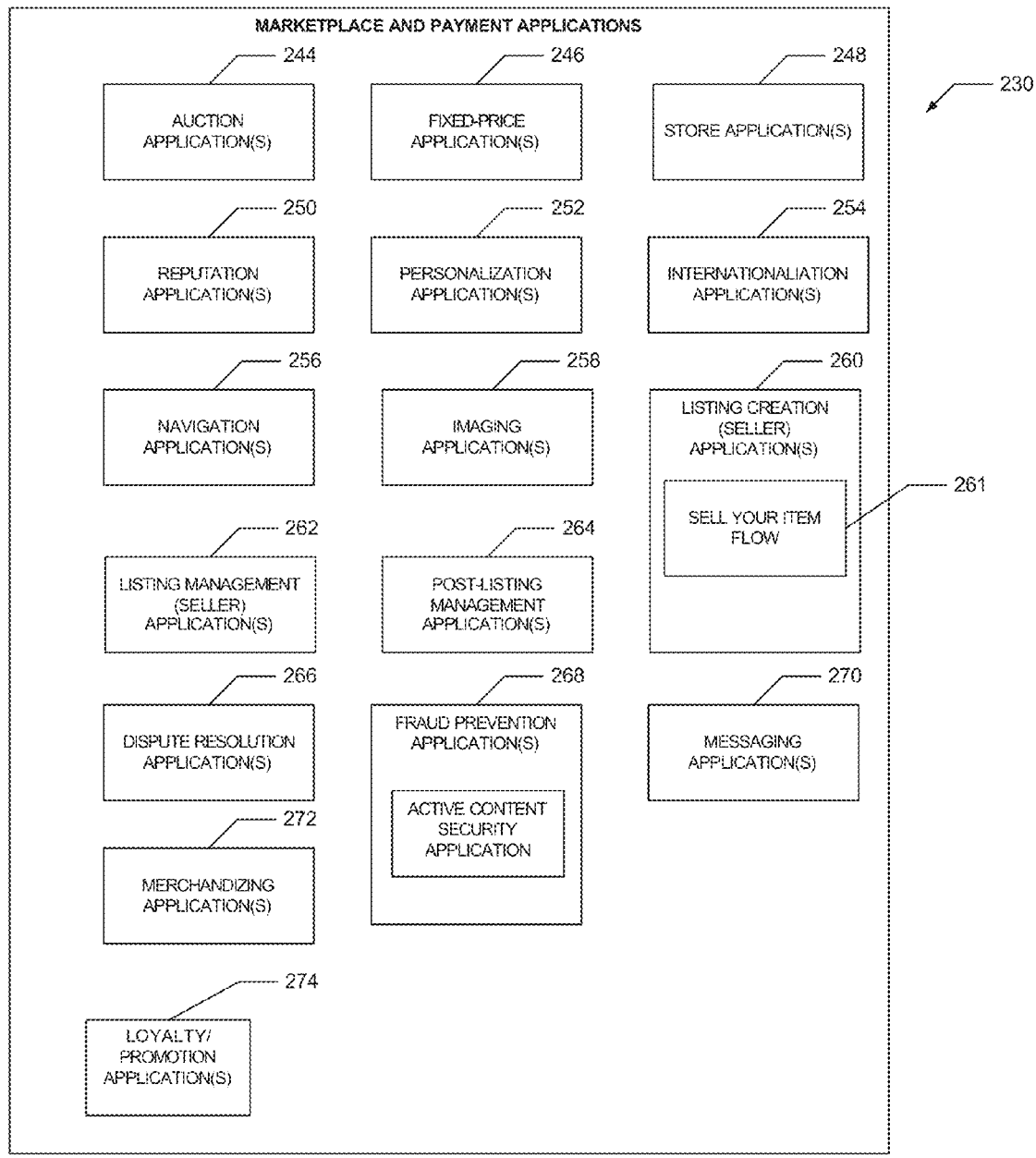
FIG. 11 is a block diagram illustrating multiple marketplace and promotional applications that, in one exemplary embodiment, are provided as part of a network-based marketplace.

FIG. 11 is a block diagram illustrating multiple marketplace and promotional applications 230 that, in one exemplary embodiment, are provided as part of the network-based marketplace 212. The marketplace 212 may provide a number of listing and price-setting mechanisms whereby a seller can list goods or services for sale, a buyer can express interest in or indicate a desire to purchase such goods or services, and a price can be set for a transaction pertaining to the goods or services. To this end, the marketplace applications 230 are shown to include one or more auction applications 244 with support auction-format listings and price setting mechanisms (e.g., English, Dutch, Vickrey, Chinese, Double, Reverse auctions etc.). The various auction applications 244 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 246 support fixed-price listing formats (e.g., the traditional classified advertisement-type listing or a catalogue listing) and buyout-type listings. Specifically, buyout-type listings may be offered in conjunction with an auction-format listing, and allow a buyer to purchase goods or services, which are also being offered for sale via an auction, for a fixed-price which is typically higher than the starting price of the auction.

Store applications 248 allow sellers to group their listings within a "virtual" store, which may be branded and otherwise personalized by and for the sellers. Such a virtual store may also offer promotions, incentives and features that are specific and personalized to a relevant seller.

Reputation applications 250 allow parties that transact utilizing the network-based marketplace 212 to establish, build and maintain reputations, which may be made available and published to potential trading partners. Specifically, where the network-based marketplace 212 supports person-to-person trading, parties to a transaction may have no history or other reference information whereby trustworthiness and credibility may be ascertained. The reputation applications 250 allow a party, for example through feedback provided by other transaction partners, to establish a reputation over time within the network-based marketplace 212. Other potential trading partners may then reference such a reputation for the purposes of assessing credibility and trustworthiness.

Personalization applications 252 allow users of the marketplace 212 to personalize various aspects of their interactions with the marketplace 212. For example a user may, utilizing an appropriate personalization application 252, create a personalized reference page at which information regarding transactions to which the user has been a party may be viewed. Further, a personalization application 252 may enable a user to personalize listings and other aspects of their interactions with the marketplace 212 and other parties.

In one embodiment, the network-based marketplace 212 may support a number of marketplaces that are customized, for example for specific geographic regions. A version of the marketplace 212 may be customized for the United Kingdom, whereas another version of the marketplace 212 may be customized for the United States. Each of these versions may operate as an independent marketplace, or may be customized (or internationalized) presentations of a common underlying marketplace.

Navigation of the network based-marketplace 212 may be facilitated by one or more navigation applications 256. For example, a search application enables key word searches of listings published via the marketplace 212. A browse application allows users to browse various category, or catalogue, data structures according to which listings may be classified within the marketplace 212. Various other navigation applications may be provided to supplement the search and browsing applications.

In order to make listings available via the network-based marketplace 212 as visually informing and attractive as possible, the marketplace applications 230 may include one or more imaging applications 258 utilizing which users may upload images for inclusion within listings. An imaging application 258 also operates to incorporate images within viewed listings. The imaging applications 258 may also support one or more promotional features, such as image galleries that may be presented to potential buyers. For example, sellers may pay an additional fee to have an image associated with one or more of the listings included within a gallery of images for promoted items.

Listing creation applications 260 allow sellers conveniently to author listings pertaining to goods or services that they wish to transact via the marketplace 212, and listing management applications 262 allow sellers to manage such listings. Specifically, where a particular seller has authored and/or published a large number of listings, the management of such listings may present a challenge. The listing management applications 262 provide a number of features (e.g., auto-relisting, inventory level monitors, etc.) to assist the seller in managing such listings. One or more post-listing management applications 264 also assist sellers with a number of activities that typically occur post-listing. For example, upon completion of an auction facilitated by one or more auction applications 244, a seller may wish to leave feedback regarding a particular buyer. To this end, a post-listing management application 264 may provide an interface to one or more reputation applications 250, so as to allow the seller conveniently to provide feedback regarding multiple buyers to the reputation applications 250.

Dispute resolution applications 266 provide mechanisms whereby disputes that may arise between transacting parties may be resolved. Specifically, the dispute resolution applications 266 may provide guided procedures whereby the parties are guided through a number of steps in an attempt to settle the dispute. In the event that the dispute cannot be settled via the guided procedures, the dispute may be escalated to a third party mediator or arbitrator.

A number of fraud prevention applications 268 implement various fraud detection and prevention mechanisms to reduce the occurrence of fraud within the marketplace 212. The fraud prevention applications 268 are also shown to include, in one embodiment, an active content security application, which may embody any one or more of the modules or components described above. In this embodiment, the active content security system 10 may be tightly integrated into a network-based marketplace 212 as an application.

Messaging applications 278 are responsible for the generation and delivery of messages to users of the network-based marketplace 212, such messages for example advising users regarding the status of listings at the marketplace 212

(e.g., providing "outbid" notices to bidders during an auction process or to provide promotional and merchandising information to users).

Merchandising applications 280 support various merchandising functions that are made available to sellers to enable sellers to increase sales via the marketplace 212. The merchandising applications 280 also operate the various merchandising features that may be invoked by sellers, and may monitor and track the success of merchandising strategies employed by sellers.

The network-based marketplace 212 itself, or one or more parties that transact via the marketplace 212, may operate loyalty programs that are supported by one or more loyalty/promotions applications 282. For example, a buyer may earn loyalty or promotions points for each transaction established and/or concluded with a particular seller via the marketplace 212, and be offered a reward for which accumulated loyalty points can be redeemed. A user may also accumulate value in forms other than points. For example, value may be accumulated through coupons, gift certificates, etc.

The loyalty/promotion applications 282 include at least one accumulation module 284 that is responsible for registering the accumulation of value (e.g., points, coupons, gift certificates) within the accounts of users, and a redemption module 286 that is responsible for the redemption of accumulated value by users. Each of the accumulation and redemption modules 284 and 286 is shown to include a verification process, a lookup process, and an update process. The loyalty/promotion applications 282 also include a statistics module 288 that, as will be described in further detail below, is responsible for the generation of statistics pertaining to reward activities or events that may be registered with the loyalty/promotion applications 282.

Figure 12:
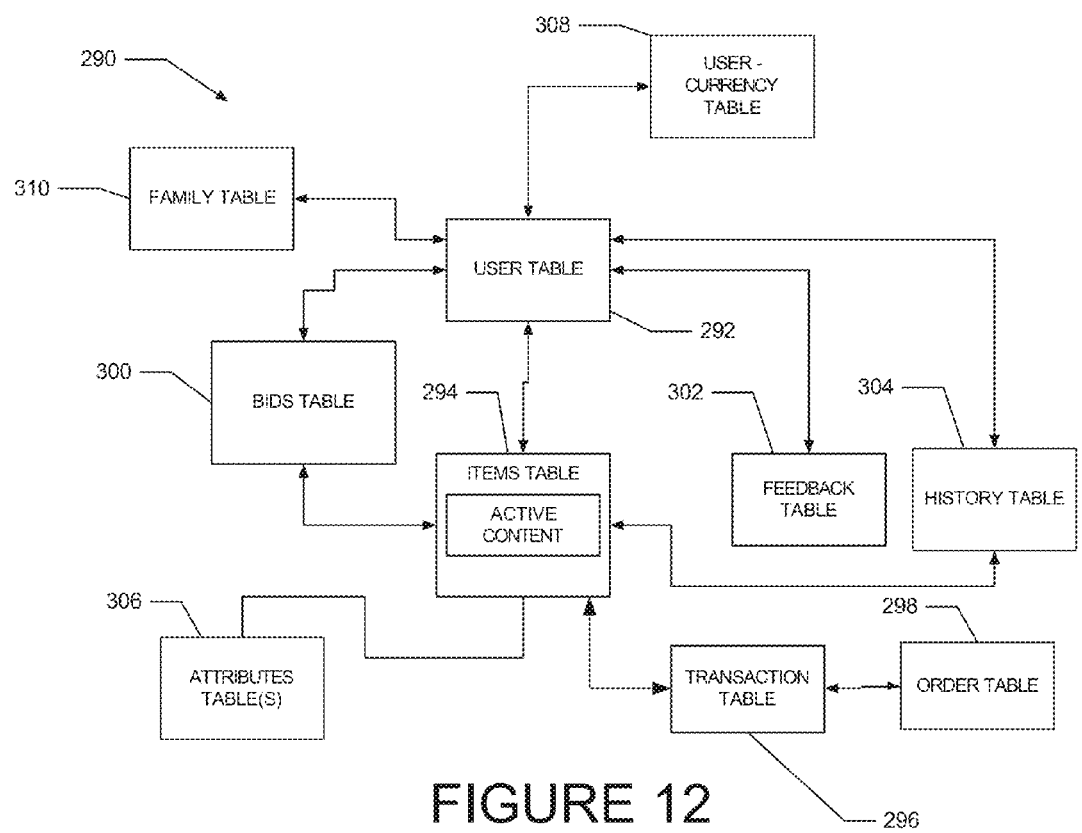
FIG. 12 is an entity-relationship diagram illustrating various tables that may be maintained within a database, according to one exemplary embodiment, that supports a network-based marketplace.

FIG. 12 is an entity-relationship diagram, illustrating various tables 290 that may be maintained within the databases 236, and that are utilized by and support the marketplace 212 and payment/redemption applications 230 and 232. A user table 292 contains a record for each registered user of the network-based marketplace 212, and may include identifier, address and financial instrument information pertaining to each such registered user. A user may, it will be appreciated, operate as a seller, a buyer, or both, within the network-based marketplace 212. In one exemplary embodiment of the present convention, a buyer may be a user that has accumulated value (e.g., promotional or loyalty points, coupons, gift certificates), and is then able to exchange the accumulated value for items that are offered for sale by the network-based marketplace 212.

The tables 290 also include an items table 294 in which is maintained an item record for each item or service that is available to be, or has been, transacted via the marketplace 212. Each item record within the items table 294 may furthermore be linked to one or more user records within the user table 292, so as to associate a seller and one or more actual or potential buyers with each item record. In one exemplary embodiment, certain of the items for which records exist within the items table 294 may be promotional (or loyalty) items for which promotional or loyalty points (or other accumulated value) can be exchanged by a user. Any one or more of item records within the items table 294 may include active content, and accordingly be analyzed and verified by the active content security system 10, according to an exemplary embodiment.

A transaction table 296 contains a record for each transaction (e.g., a purchase transaction) pertaining to items for which records exist within the items table 294.

An order table 298 is populated with order records, each order record being associated with an order. Each order, in turn, may be with respect to one or more transactions for which records exist within the transactions table 296.

Bids records within a bids table 300 each relate to a bid receive at the network-based marketplace 212 in connection with an auction form of listing supported by an auction application 244. A feedback table 302 is utilized by one or more reputation applications 250, in one exemplary embodiment, to construct and maintain reputation information concerning users. A history table 304 maintains a history of transactions to which a user has been a party. One or more attributes tables 306 record attribute information pertaining to items for which records exist within the items table 294. Considering only a single example of such an attribute, the attributes tables 306 may indicate a currency attribute associated with a particular item.

Figure 13:
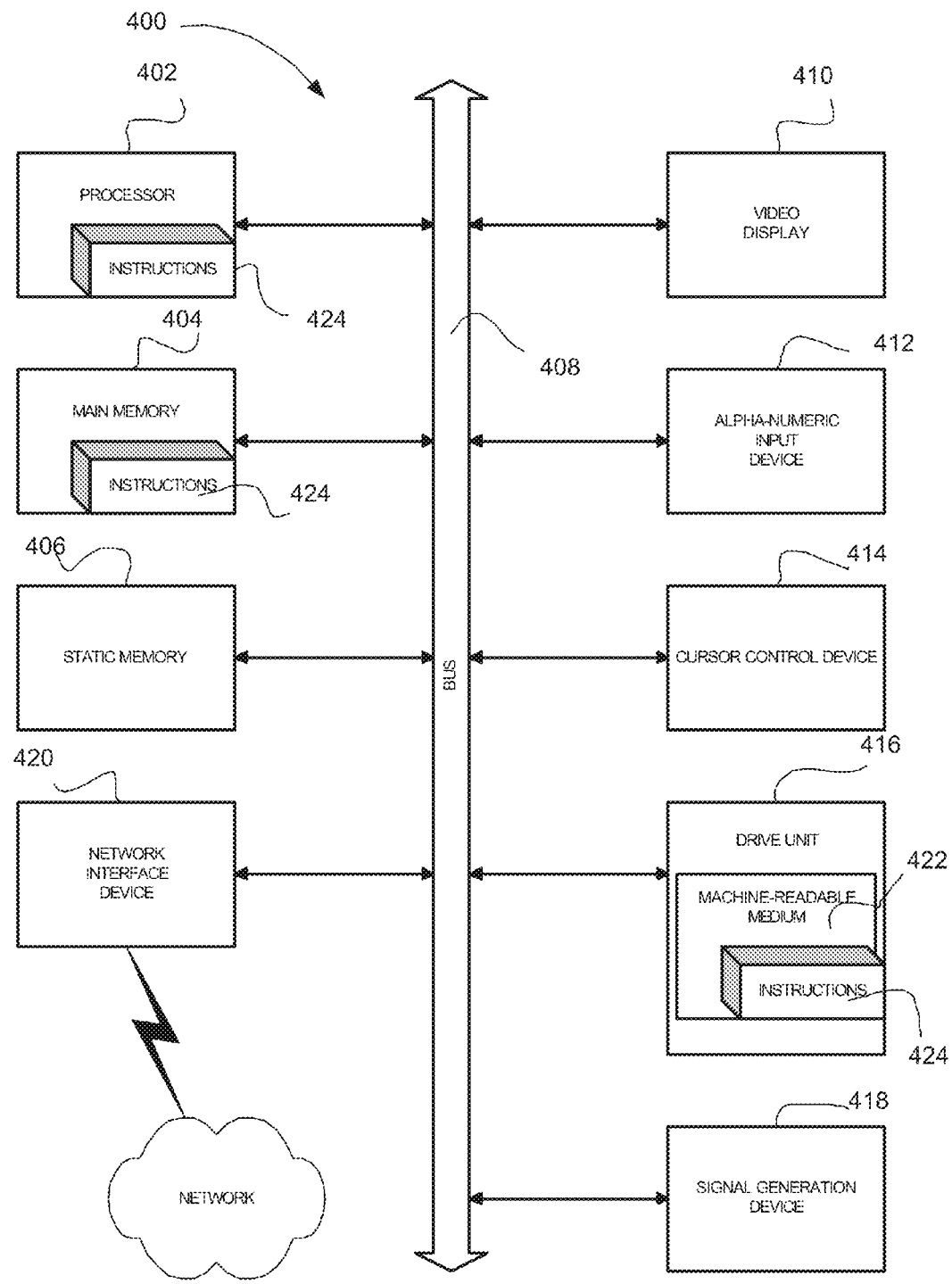
FIG. 13 is a diagrammatic representation of a machine, in the exemplary form of a computer system, within which a set of instructions for causing the machine to perform any one of the methodologies discussed herein may be executed.

FIG. 13 shows a diagrammatic representation of machine in the exemplary form of a computer system 400 within which a set of instructions, for causing the machine to perform any one or more of the methodologies discussed herein, may be executed. In various embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processor 402 (e.g., a central processing unit (CPU) a graphics processing unit (GPU) or both), a main memory 404 and a static memory 406, which communicate with each other via a bus 408. The computer system 400 may further include a video display unit 410 (e.g., a liquid crystal display (LCD) or a cathode ray tube (CRT)). The computer system 400 also includes an alphanumeric input device 412 (e.g., a keyboard), a cursor control device 414 (e.g., a mouse), a disk drive unit 416, a signal generation device 418 (e.g., a speaker) and a network interface device 420.

The disk drive unit 416 includes a machine-readable medium 422 on which is stored one or more sets of instructions (e.g., software 424) embodying any one or more of the methodologies or functions described herein. The software 424 may also reside, completely or at least partially, within the main memory 404 and/or within the processor 402 during execution thereof by the computer system 400, the main memory 404 and the processor 402 also constituting machine-readable media.

The software 424 may further be transmitted or received over a network 426 via the network interface device 420.

While the machine-readable medium 422 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to included, but not be limited to, solid-state memories, optical and magnetic media, and carrier wave signals.

What is claimed is:

1. A method comprising:
performing a first validation, based on a configuration of an active content security system associated with a hosting server, that active content does not create a security risk upon publication by the hosting server;
publishing, by the hosting server as an online publication, the active content in response to validation that publication does not create a security risk;
performing a second validation, subsequent to publishing the active content by the hosting server, of the active content to ensure that the active content continues not to create a security risk; and
removing, using the hosting server, the active content based on, subsequent to initial publishing, the active content being found to create a security risk.

2. The method of claim 1, wherein the first validation of the active content includes validating a mark-up language document.

3. The method of claim 1, wherein the first validation of the active content includes validating executable code including determining that the executable code is not malicious.

4. The method of claim 1, further comprising storing the active content in a database, and wherein the second validation of the active content includes extracting the active content from the database and setting a flag in the database associated with the active content based on the active content being free of malicious content.

5. The method of claim 4, wherein publishing the active content includes extracting the active content from the database and checking the flag associated with the active content before publishing the active content as the online publication.

6. The method of claim 1, wherein the first validation of the active content includes validating a link to a storage location included within the active content, and validating the link includes accessing external data referenced by the link and retrieving the external data to verify the external data is free of malicious content.

7. The method of claim 6, wherein the second validation of the active content includes repeatedly re-downloading the external data to validate the external data remains free of malicious content after initial publication to the online publication.

8. The method of claim 1, further comprising generating, in response to the first or second validation of the active content, a notification if the active content is found to contain a security risk.

9. A system comprising:
a server including one or more processors and a network interface communicatively coupled to a network, the server hosting a publication system, the publication system including:
an interface module to receive active content from a user over the network, the active content to be published by the publication system over the network;
a verification module, executed on the one or more processors, to,
verify, based on a configuration of verification module, that the active content does not create a security risk upon publication over the network, and
perform a first validation of the active content after an initial publication to verify that the active content continues not to create a security risk, and subsequent to the initial publication, retrieve the active content at regular, predefined intervals to validate it remains free of malicious content; and
a publication module, executed on the one or more processors, to publish, based on the active content being determined not to create a security risk, the active content.

10. The system of claim 9, wherein the interface module receives a mark-up language document as at least a portion of the active content.

11. The system of claim 9, wherein the interface module receives executable code as at least a portion of the active content; and
wherein the verification module verifies that the executable code is not malicious.

12. The system of claim 9, further comprising a database to store the active content, wherein the verification module extracts the active content from the database to validate after initial publication.

13. The system of claim 12, wherein the publication module extracts the active content from the database to publish the active content over the network.

14. The system of claim 9, wherein the interface module receives a reference to a storage location as at least a portion of the active content; and
wherein the verification module accesses the reference to retrieve data referenced and to initially verify, or subsequent to initial publication validate, the data referenced does not create a security risk.

15. The system of claim 14, wherein the storage location contains executable code to be retrieved and published as a portion of the active content.

16. The system of claim 15, wherein the storage location is external to the server; and
wherein the verification module communicates over the network to retrieve the executable code.

17. The system of claim 9, further comprising a notification module to provide an automated notification in response to the verification module verifying or validating the active content.

18. A non-transitory machine-readable storage medium including instructions that, when executed by an online publication system, cause the online publication system to perform operations comprising:
performing a first validation, based on a configuration of an active content security system associated with a hosting server within the online publication system, that active content does not create a security risk upon publication by the hosting server;
publishing, by the hosting server as an online publication, the active content in response to validation that publication does not create a security risk;
performing a second validation, subsequent to publishing the active content by the hosting server, of the active content to ensure that the active content continues not to create a security risk; and
removing, using the hosting server, the active content based on, subsequent to initial publishing, the active content being found to create a security risk.

19. The machine-readable storage medium of claim 18, wherein the instructions that cause the online publication system to perform the second validation of the active content further include instructions that verify that any links to external data within the active content do not link to malicious content.

20. The machine-readable storage medium of claim 18, wherein the instructions that cause the online publication system to perform the second validation of the publication data repeatedly validates that any links to external data within the publication data do not link to malicious content.

\* \* \* \* \*